United States Patent
Bukhari et al.

(10) Patent No.: US 11,966,635 B2
(45) Date of Patent: Apr. 23, 2024

(54) LOGICAL UNIT NUMBER QUEUES AND LOGICAL UNIT NUMBER QUEUE SCHEDULING FOR MEMORY DEVICES

(71) Applicant: Micron Technology, Inc., Boise, ID (US)

(72) Inventors: Shakeel Isamohiuddin Bukhari, San Jose, CA (US); Mark Ish, Manassas, VA (US)

(73) Assignee: Micron Technology, Inc., Boise, ID (US)

(*) Notice: Subject to any disclaimer, the term of this patent is extended or adjusted under 35 U.S.C. 154(b) by 37 days.

(21) Appl. No.: 17/931,934

(22) Filed: Sep. 14, 2022

(65) Prior Publication Data
US 2024/0069808 A1 Feb. 29, 2024

Related U.S. Application Data

(60) Provisional application No. 63/374,086, filed on Aug. 31, 2022.

(51) Int. Cl.
G06F 12/00 (2006.01)
G06F 3/06 (2006.01)
G06F 12/02 (2006.01)

(52) U.S. Cl.
CPC ........ *G06F 3/0659* (2013.01); *G06F 12/0253* (2013.01); *G06F 3/0604* (2013.01); *G06F 3/0679* (2013.01)

(58) Field of Classification Search
CPC .. G06F 3/0659; G06F 12/0253; G06F 3/0604; G06F 3/0679
See application file for complete search history.

(56) References Cited

U.S. PATENT DOCUMENTS

| | | | |
|---|---|---|---|
| 2015/0201018 A1* | 7/2015 | Abram | H04L 41/00 707/736 |
| 2018/0314421 A1* | 11/2018 | Linkovsky | G06F 3/0679 |
| 2021/0181980 A1* | 6/2021 | Rao | G06F 3/0653 |
| 2022/0334774 A1* | 10/2022 | Amaro Ramirez | G06F 3/0679 |
| 2022/0413719 A1* | 12/2022 | Wu | G06F 3/0659 |

\* cited by examiner

*Primary Examiner* — John A Lane
(74) *Attorney, Agent, or Firm* — Harrity & Harrity, LLP

(57) ABSTRACT

A memory device may include logical units configured to store data, wherein the logical units are identified by corresponding logical unit numbers (LUNs) and are associated with corresponding LUN queue groups. Each LUN queue group may include LUN queues that are each associated with a respective intra-LUN priority level that indicates a priority of a LUN queue within a LUN queue group. The LUN queues are each associated with a respective execution priority level that indicates a priority for execution of commands in a LUN queue across LUN queue groups. A quantity of intra-LUN priority levels may be greater than a quantity of execution priority levels. A LUN scheduler may be configured to select and transfer commands from LUN queue groups to the execution queue group based on intra-LUN priority levels. A command executor may be configured to execute commands from the execution queue group based on execution priority levels.

25 Claims, 11 Drawing Sheets

LOGICAL UNIT NUMBER QUEUES AND LOGICAL UNIT NUMBER QUEUE SCHEDULING FOR MEMORY DEVICES

CROSS-REFERENCE TO RELATED APPLICATION

This Patent Application claims priority to U.S. Provisional Patent Application No. 63/374,086, filed on Aug. 31, 2022, and entitled "LOGICAL UNIT NUMBER QUEUES AND LOGICAL UNIT NUMBER QUEUE SCHEDULING FOR MEMORY DEVICES." The disclosure of the prior Application is considered part of and is incorporated by reference into this Patent Application.

TECHNICAL FIELD

The present disclosure generally relates to memory devices, memory device operations, and, for example, to logical unit number queues and logical unit number queue scheduling for memory devices.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

A memory device may include multiple logical units configured to store data. When the memory device receives or generates a command (e.g., a read command, a write command, or an erase command), the memory device may need to identify which logical unit is associated with the command before executing the command on the logical unit. In some cases, the memory device may perform operations on different logical units in parallel to improve performance, such as to reduce latency associated with executing commands. Some memory devices may be associated with requirements, sometimes called quality of service (QoS) requirements. As an example, a memory device may be associated with a requirement to execute a read command (e.g., received from a host device) within a threshold amount of time of receiving the read command.

For complex memory devices that include multiple logical units and that execute a variety of commands, it may be difficult to satisfy QoS requirements. For example, the memory device may need to employ complex algorithms to analyze multiple commands in a queue to identify high priority commands (e.g., associated with a QoS requirement) to be executed and then pull a high priority command from the queue to execute the command. This is sometimes called command queue lookahead. In some cases, command queue lookahead is processor intensive and must be performed every time a command is to be selected for execution. Furthermore, if high priority commands are associated with a single logical unit or a small number of logical units, then pulling high priority commands for execution may result in one or more idle logical units, which results in poor resource utilization and increases overall latency.

Some implementations described herein enable fine-grained control and prioritization of memory command execution across different logical units and different command types. This finer-grained prioritization may enable the memory device to satisfy QoS requirements, such as a maximum latency for a particular command type, while also achieving load balancing across logical units. Furthermore, some implementations described herein reduce processing power needed to prioritize memory commands to achieve QoS requirements and/or to achieve load balancing across logical units. For example, the memory device may avoid complex lookahead algorithms used to search through a long queue of commands to identify the next command to be transferred and/or executed. As a result, implementations described herein reduce processing power, conserve processing resources, and reduce power consumption.

Figure 1:
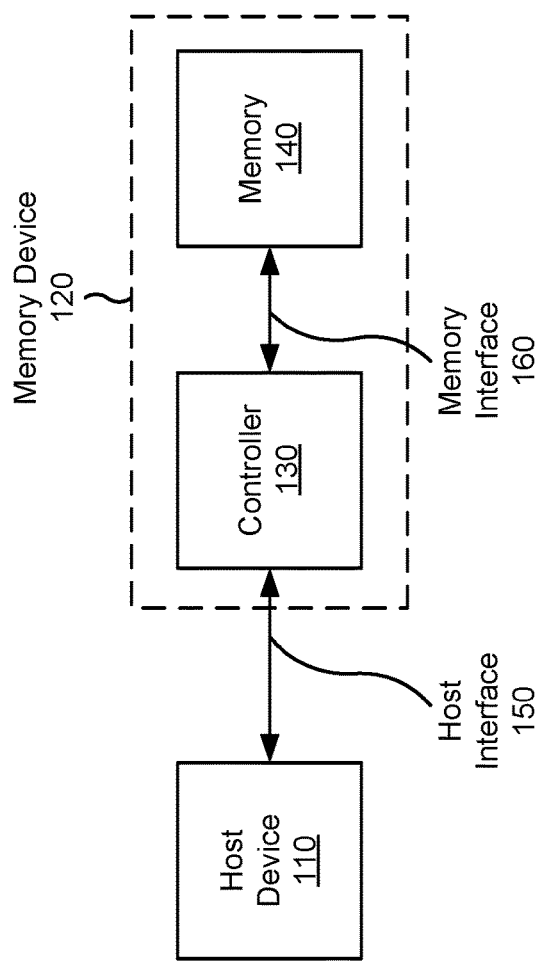
FIG. 1 is a diagram illustrating an example system capable of using logical unit number (LUN) queues and LUN queue scheduling.

FIG. 1 is a diagram illustrating an example system 100 capable of using logical unit number queues and logical unit number queue scheduling. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to receive a memory command associated with a logical unit number (LUN) of multiple LUNs associated with the memory device; and place the memory command into a LUN queue, of a LUN queue group associated with the LUN, based on one or more parameters of the memory command. In some implementations, the LUN queue is one of multiple LUN queues included in the LUN queue group, and the LUN queue group is one of multiple LUN queue groups associated with the memory device. In some implementations, each LUN queue group, included in the multiple LUN queue groups, is associated with a different LUN of the multiple LUNs associated with the memory device. In some implementations, each LUN queue, included in the LUN queue group, is associated with a respective intra-LUN priority level, of multiple intra-LUN priority levels associated with the memory device, that indicates a relative priority of commands in that LUN queue with respect to other commands in the LUN queue group. In some implementations, each LUN queue, included in the LUN queue group, is associated with an execution priority level, of multiple execution priority levels associated with the memory device, that indicates a relative priority of commands for execution on memory with respect to other commands. In some implementations, a quantity of the multiple intra-LUN priority levels is greater than a quantity of the multiple execution priority levels.

Additionally, or alternatively, the memory device 120 and/or the controller 130 may be configured to select a LUN queue group, from which a command is to be transferred to an execution queue group, based on a most recently selected LUN queue group from which an immediately preceding command was transferred to the execution queue group. In some implementations, the selected LUN queue group and the most recently selected LUN queue group are included in a plurality of LUN queue groups associated with the memory device. In some implementations, each LUN queue group, included in the plurality of LUN queue groups, is associated with a different LUN of a plurality of LUNs associated with the memory device. The memory device 120 and/or the controller 130 may be configured to select a LUN queue in the selected LUN queue group, from which the command is to be transferred to the execution queue group, based on a most recently selected LUN queue from which a most recently transferred command from the selected LUN queue group was transferred to the execution queue group. In some implementations, the selected LUN queue and the most recently selected LUN queue are included in a plurality of LUN queues that are included in the selected LUN queue group. In some implementations, each LUN queue, included in the plurality of LUN queues, is associated with an intra-LUN priority level used for selecting LUN queues within the LUN queue group, and an execution priority level used for selecting commands from the execution queue group for execution. In some implementations, a quantity of intra-LUN priority levels associated with the selected LUN queue is greater than a quantity of execution priority levels associated with the execution queue group. The memory device 120 and/or the controller 130 may be configured to transfer the command from the selected LUN queue to the execution queue group.

As indicated above, FIG. 1 is provided as an example. Other examples may differ from what is described with regard to FIG. 1.

Figure 2:
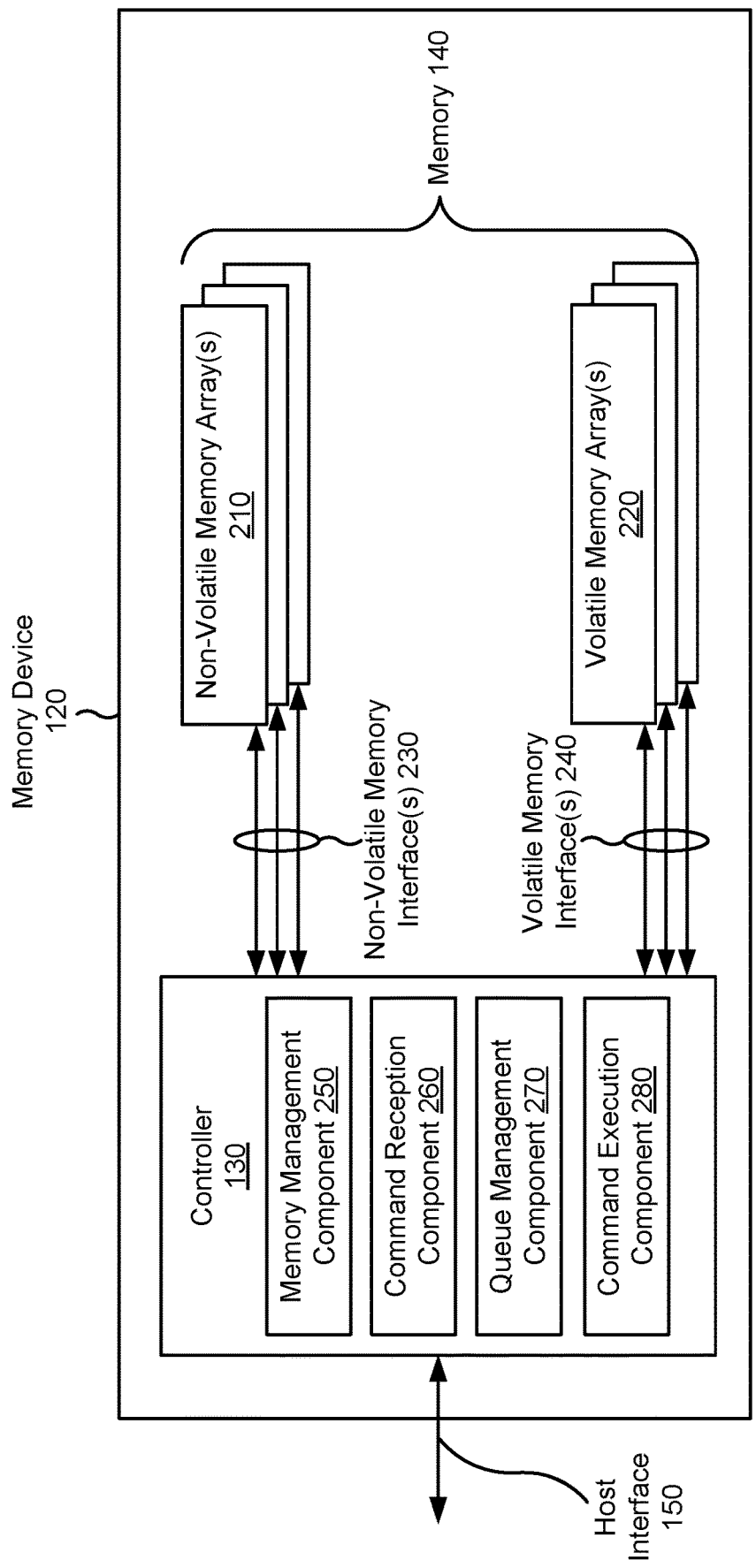
FIGS. 2 and 3 are diagrams of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, a command reception component 260, a queue management component 270, and/or a command execution component 280. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The command reception component 260 may be configured to receive one or more memory commands (sometimes called commands). The command reception component 260 may receive a command from a host device 110 and/or may receive an internally-generated command that is generated by the memory device 120. In some implementations, the command may be associated with a LUN. In some implementations, the command reception component 260 may generate commands internally for the memory device 120.

The queue management component 270 may manage one or more queues and/or queue groups of the memory device 120, such as a LUN queue, a LUN queue group, an execution queue, and/or an execution queue group. For example, the queue management component 270 may place a command into a queue and/or a queue group (e.g., based on a LUN and/or a command type associated with the command), may keep track of queue priorities, may manage queue capacity and/or queue restrictions, may keep track of which queue and/or queue group a command is to be transferred from, and/or may select a command and/or or transfer a command from a LUN queue and/or a LUN queue group to an execution queue and/or an execution queue group.

The command execution component 280 may be configured to execute one or more memory commands, such as a read command, a write command (sometimes called a program command), or an erase command. For example, the command execution component 280 may be configured to execute commands from a queue, such as an execution queue.

Figure 3:
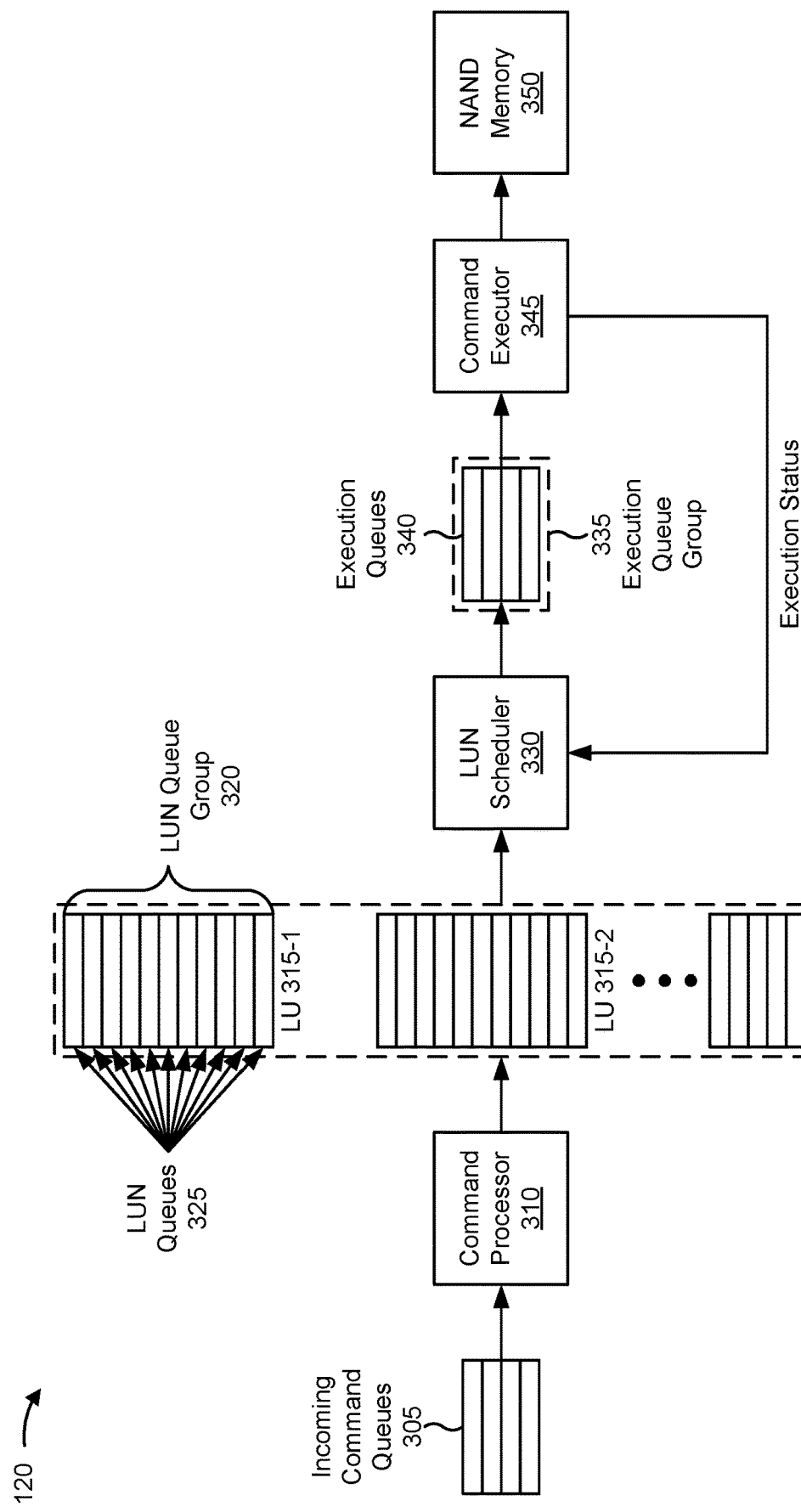
Figure 4:
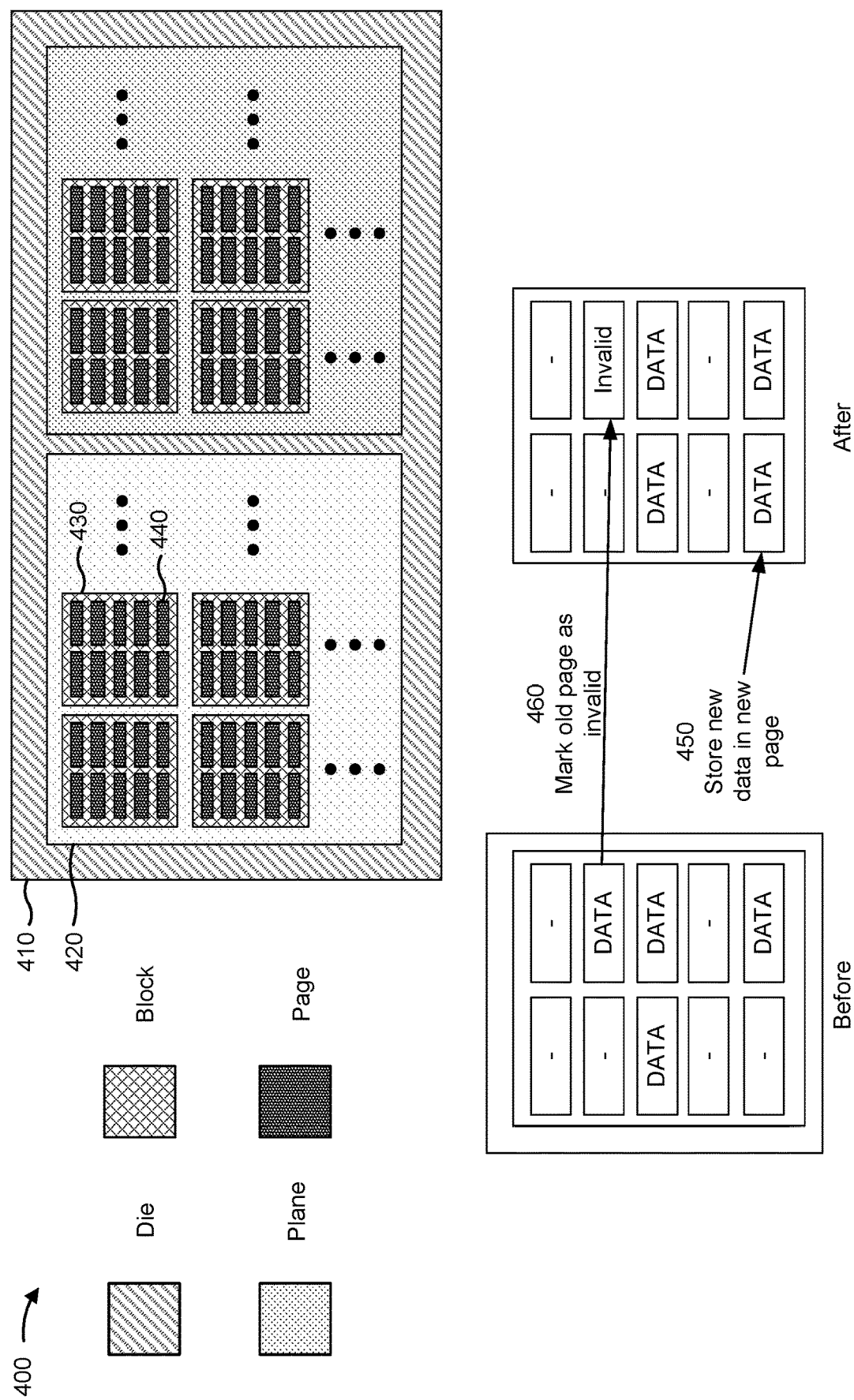
FIG. 4 is a diagram illustrating an example memory architecture that may be used by the memory device.
Figure 5:
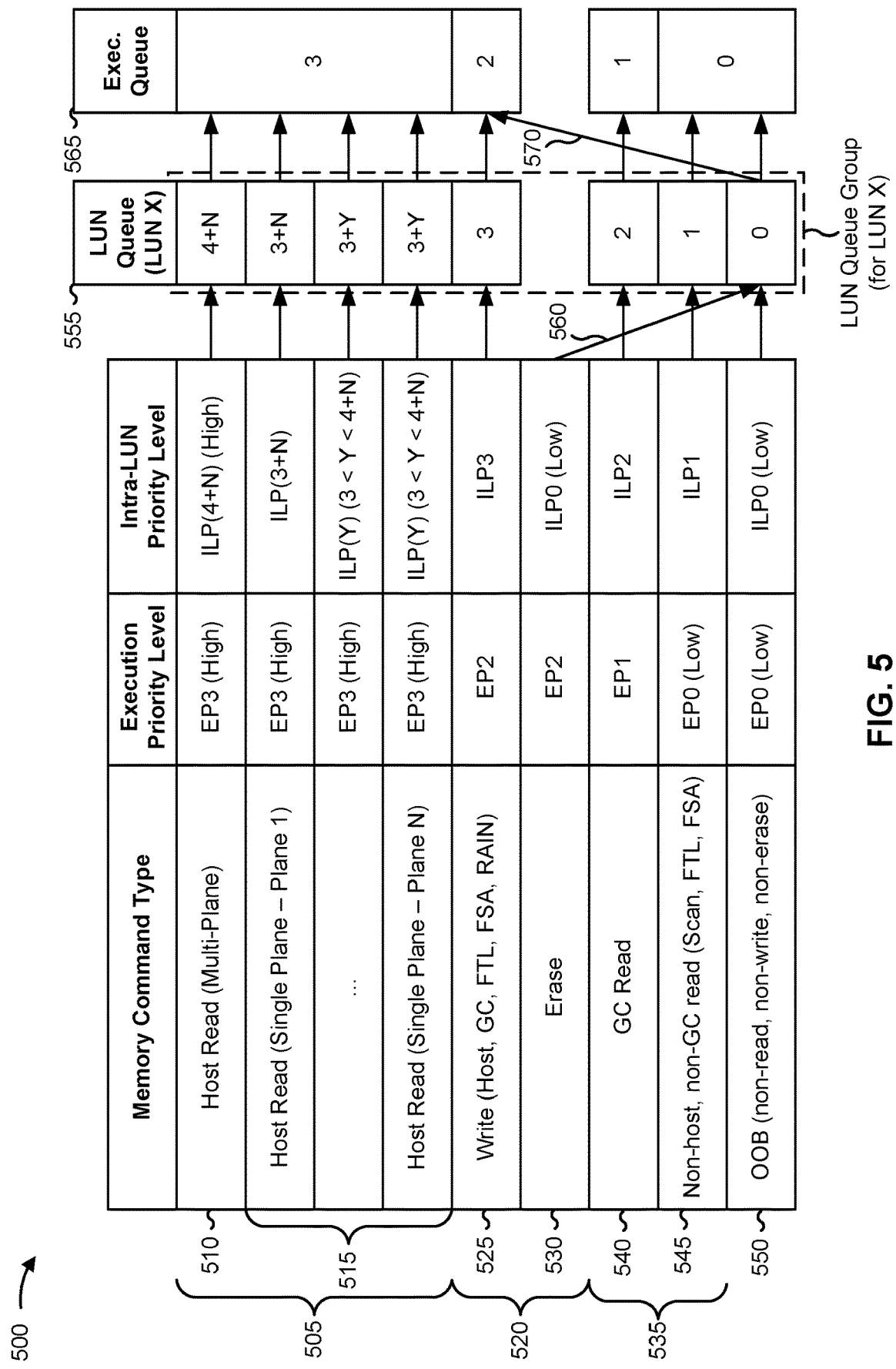
FIG. 5 is a diagram of an example prioritization of memory command types.
Figure 7:
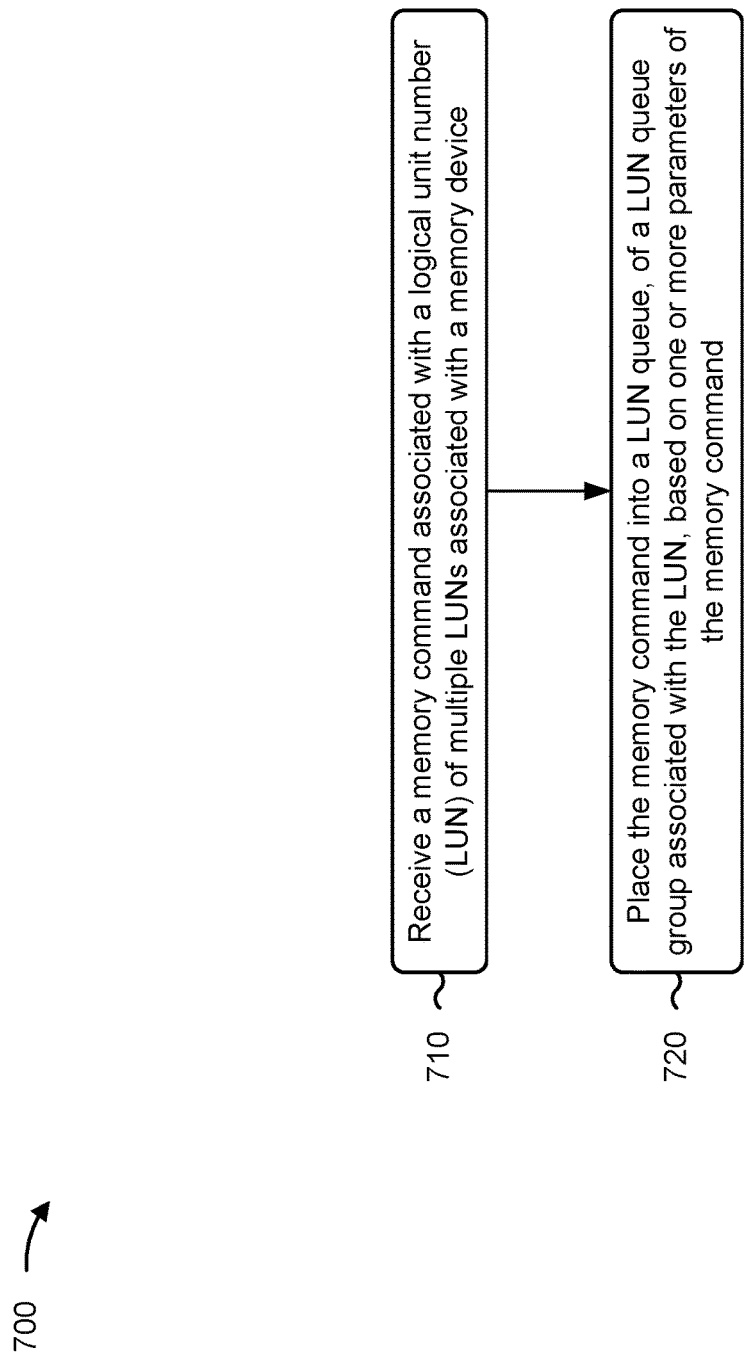
FIG. 7 is a flowchart of an example method associated with using LUN queues and LUN queue scheduling.
Figure 8:
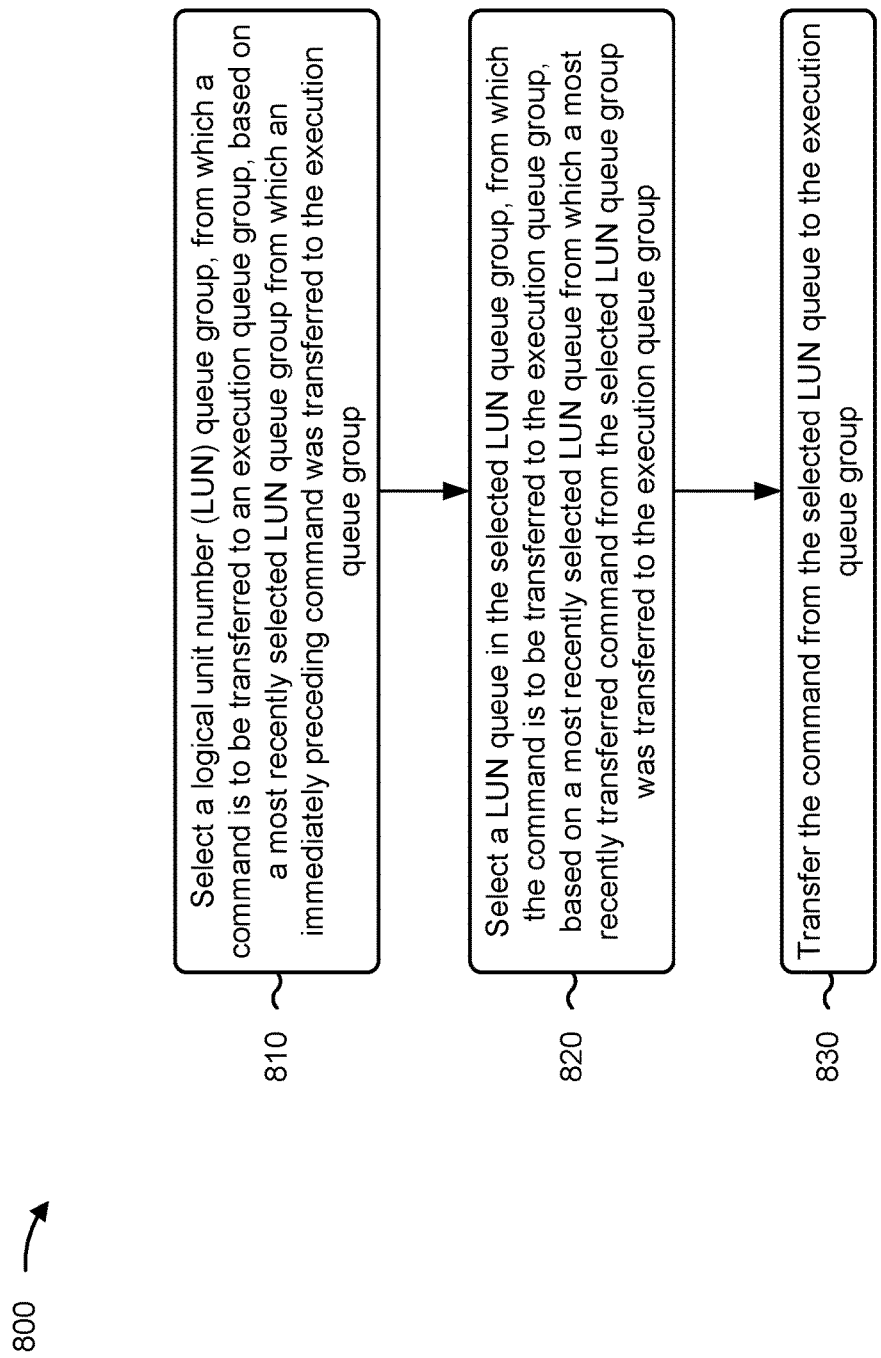
FIG. 8 is a flowchart of another example method associated with using LUN queues and LUN queue scheduling.

One or more devices or components shown in FIG. 2 may be configured to perform operations described elsewhere herein, such as one or more operations of FIGS. 3-5 and/or 6A-6D and/or one or more process blocks of the methods of FIGS. 7-8. For example, the controller 130, memory management component 250, the command reception component 260, the queue management component 270, and/or the command execution component 280 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

FIG. 3 is a diagram of example components included in a memory device 120. In some implementations, one or more components described above in connection with FIG. 2 may perform one or more operations described in connection with one or more components of FIG. 3. Additionally, or alternatively, one or more components described in connection with FIG. 3 may perform one or more operations described above in connection with one or more components of FIG. 2. The memory device 120 may include all of the components shown in FIG. 2 and FIG. 3 or a subset of the components shown in FIG. 2 and FIG. 3. As shown in FIG. 3, in some implementations, the memory device 120 includes one or more incoming command queues 305, a command processor 310, multiple logical units 315 (shown as LU 315-1, LU 315-2, . . . , LU 315-X) identified by respective logical unit numbers (LUNs), multiple LUN queue groups 320, multiple LUN queues 325, a LUN scheduler 330, an execution queue group 335, one or more execution queues 340, a command executor 345, and/or NAND memory 350.

An incoming command queue 305 may be configured to receive and/or store incoming commands for the memory device 120. An incoming command may include a host command or a non-host command. A host command is a command received from a host device 110 (e.g., via the host interface 150), such as a host read command from a host device 110 to read data from memory or a host write command from a host device 110 to write data to memory. A non-host write command is a write command that is not received from the host device 110. For example, a non-host write command may be generated internally by the memory device 120, such as a garbage collection (GC) command, a flash translation layer (FTL) command, a file system area (FSA) command, or a redundant array of independent NAND (RAIN) command. An incoming command queue 305 may store an incoming command regardless of a logical unit 315 on which that incoming command is to be performed. Thus, the incoming command queue 305 may be associated with multiple LUNs (e.g., may store a first command for a first LUN, a second command for a second LUN, and so on). In some implementations, the memory device 120 may include multiple incoming command queues 305 for different types of commands, such as an incoming command queue for host commands and an incoming command queue for internally generated commands. For example, the memory device 120 may include an incoming command queue for host read commands, an incoming command queue for non-host read commands, an incoming command queue for all write commands (host and non-host write commands), and an incoming queue for out-of-band (OOB) commands (e.g., non-read and non-write commands, such as erase commands).

The command processor 310 may be configured to generate commands for placement in LUN queues 325 of LUN queue groups 320. For example, the command processor 310 may receive or obtain an incoming command from an incoming command queue 305 and may translate the incoming command to generate a translated command. For example, the command processor 310 may translate a logical address (e.g., a logical block address, or LBA), indicated in an incoming command, to a physical address (e.g., a physical block address) indicated in the translated command. The command processor 310 may be configured to identify a LUN queue group 320 for the command and/or a LUN queue 325 (e.g., within that LUN queue group 320) for the command.

For example, the command processor 310 may identify a LUN associated with a command based on a LUN indicator (e.g., an LBA and/or a LUN identifier) included in the command. The command processor 310 may identify a LUN queue group 320 for the command based on the LUN indicator (e.g., each LUN may be associated with a particular LUN queue group 320). Additionally, or alternatively, the command processor 310 may identify one or more parameters (sometimes called one or more command parameters) associated with the command (e.g., indicated in the command), such as a command type of the command. The command processor 310 may identify a LUN queue 325, within the identified LUN queue group 320, for the command based on the one or more parameters. The command processor 310 may add and/or place the command into the identified LUN queue 325 of the identified LUN queue group 320.

A logical unit 315 is a portion of memory 140 configured to store data. For example, a logical unit 315 may include non-volatile memory on a particular semiconductor die. In some implementations, a logical unit 315 may include all non-volatile memory, on a semiconductor die, that is accessible to a host device 110 (e.g., all host-addressable non-volatile memory on the semiconductor die). Alternatively, a logical unit 315 may include a portion of non-volatile memory on a semiconductor die, such as one or more planes of non-volatile memory on a semiconductor die, as described in more detail below in connection with FIG. 4. A logical unit 315 is identified by a LUN. Thus, the memory device 120 may be associated with multiple LUNs, where each LUN identifies a respective logical unit 315. As used herein, the term "LUN" may refer to the logical unit 315 or an identifier (e.g., a number) of that logical unit 315 depending on the context.

A LUN queue group 320 is a group of LUN queues 325 associated with the same LUN. As shown, the memory device 120 may include multiple LUN queue groups 320, such as one LUN queue group 320 for each LUN included in the memory device 120 (e.g., LUN 1, LUN 2, . . . , LUN X). A LUN queue group 320 may store commands for only the LUN with which the LUN queue group 320 (e.g., may store command for only the LUN on which those commands are to be executed). Thus, each LUN queue group 320 may be associated with a different LUN of the multiple LUNs included in the memory device 120.

A LUN queue 325 may be configured to store commands to be executed on a LUN associated with that LUN queue 325. For example, a LUN queue 325 may store one or more translated commands generated by the command processor 310 and/or placed into the LUN queue 325 by the command processor 310. As shown, the memory device 120 may include multiple LUN queues 325 per LUN queue group 320. For example, a first LUN queue group 320 may include a first group of LUN queues 325 associated with a first LUN (e.g., LUN 1), a second LUN queue group 320 may include a second group of LUN queues 325 associated with a second LUN (e.g., LUN 2), and so on.

Each LUN queue 325 may store a specific command type or a specific set of command types (e.g., a specific set of one or more command types) to be executed on a LUN associated with that LUN queue 325 (e.g., a LUN associated with the LUN queue group 320 in which the LUN queue 325 is included). Within a LUN queue group 320, each LUN queue 325 may be associated with a different command type or a different set of command types. For example, a first LUN queue 325 of a LUN queue group 320 may store a first command type, a second LUN queue 325 of the LUN queue group 320 may store a second command type, and so on. In some implementations, each LUN queue group 320 may include the same set of LUN queue types. For example, each LUN queue group 320 may include a respective first LUN queue 325 that stores the first command type, a respective second LUN queue 325 that stores the second command type, and so on. A LUN queue 325 may store commands having only the command type associated with that LUN queue 325 and for only the LUN with which the LUN queue 325 is associated. In some implementations, each LUN queue 325 is associated with an intra-LUN priority level and an execution priority level, as described in more detail below in connection with FIG. 5.

The LUN scheduler 330 may be configured to select a LUN queue group 320 from which a command is to be transferred to the execution queue group 335 for execution by the command executor 345 on the NAND memory 350. For example, the LUN scheduler 330 may select LUN queue groups 320 sequentially, such that the LUN scheduler 330 selects a first LUN queue group 320 (e.g., associated with LUN 1) and transfers a command from the first LUN queue group 320 to the execution queue group 335, and then selects a second LUN queue group 320 (e.g., associated with LUN 2) and transfers a command from the second LUN queue group 320 to the execution queue group 335, and so on. Thus, the LUN scheduler 330 may select a LUN queue group 320 based on a most recently selected LUN queue group 320 from which an immediately preceding command (e.g., a most recently transferred command across all LUN queue groups 320 of the multiple LUN queue groups 320 included in the memory device 120) was transferred to the execution queue group 335. In other words, the LUN scheduler 330 may select a LUN queue group 320 based on a most recently selected LUN queue group 320 that was selected most recently before the newly selected LUN queue group 320.

The LUN scheduler 330 may be configured to select a LUN queue 325, within the selected LUN queue group 320, from which the command is to be transferred to the execution queue group 335 for execution by the command executor 345 on the NAND memory 350. For example, the LUN scheduler 330 may select LUN queues 325 sequentially within a LUN queue group 320, such that the LUN scheduler 330 selects a first LUN queue 325 within the LUN queue group 320 (e.g., associated with LUN 1) and transfers a command from the first LUN queue 325 to the execution queue group 335, and then selects a second LUN queue 325 within the LUN queue group 320 (e.g., the next time the LUN queue group 320 is selected, which may be after the rest of the LUN queue groups 320 have been selected) and transfers a command from the second LUN queue 325 of the LUN queue group 320 to the execution queue group 335, and so on. Thus, the LUN scheduler 330 may select a LUN queue 325 included in a selected LUN queue group 320 based on a most recently selected LUN queue 325, included in the selected LUN queue group 320, from which a most recently selected command, from the selected LUN queue group 320, was transferred to the execution queue group 335. In other words, the LUN scheduler 330 may select a LUN queue 325 from a selected LUN queue group 320 based on a most recently selected LUN queue 325, in the selected LUN queue group 320, that was selected most recently before the newly selected LUN queue 325 in the selected LUN queue group 320.

After selecting a LUN queue group 320 and a LUN queue 325 within that LUN queue group 320, the LUN scheduler 330 may be configured to transfer a command from that LUN queue 325 to the execution queue group 335 for execution by the command executor 345 on the NAND memory 350. In some implementations, the LUN scheduler 330 may determine whether one or more conditions (sometimes called one or more transfer conditions) are satisfied before transferring the command to the execution queue group 335, such as based on monitoring the execution queue group 335 and/or receiving an indication of an execution status from the command executor 345. Additional details associated with selecting a LUN queue group 320, selecting a LUN queue 325, determining whether one or more transfer conditions are satisfied, and transferring commands to the execution queue group 335 are described elsewhere herein.

An execution queue group 335 is a group of execution queues 340 from which commands are selected by the command executor 345 for execution. In some implementations, the memory device 120 may include a single execution queue group 335 that stores commands for multiple LUNs. The execution queue group 335 may include a single execution queue 340 or multiple execution queues 340. In some implementations, the quantity of LUN queues 325 included in a LUN queue group 320 is greater than a quantity of execution queues 340 included in the execution queue group 335, as described in more detail below in connection with FIG. 5.

An execution queue 340 may be configured to store commands to be executed by the command executor 345 and/or on the NAND memory 350. For example, an execution queue 340 may store a command that has been transferred from a LUN queue 325. In some implementations, each execution queue 340 included in the execution queue group 335 may be associated with a different execution priority level. For example, a first execution queue 340 may be associated with a first execution priority level, a second execution queue 340 may be associated with a second execution priority level, and so on. Additionally, or alternatively, each execution queue 340 included in the execution queue group 335 may be associated with a different command type or a different set of command types. For example, a first execution queue 340 may store a first command type, a second execution queue 340 may store a second command type, and so on. Additional details are described below in connection with FIG. 5.

The command executor 345 may be configured to execute commands from the execution queue group 335. For example, the command executor 345 may be configured to execute commands from the execution queue group 335 based on execution priority levels. In some implementations, the command executor 345 may select execution queues 340 sequentially (e.g., within the execution queue group 335), such that the command executor 345 selects a first execution queue 340 and executes a command from the first execution queue 340, and then selects a second execution queue 340 and executes a command from the second execution queue 340, and so on. Thus, the command executor 345 may select an execution queue 340 based on a most recently selected execution queue 340 from which a most recently selected command was executed. In other words, the command executor 345 may select an execution queue 340 based on a most recently selected execution queue 340 that was selected most recently before the newly selected execution queue 340. After selecting an execution queue 340, the command executor 345 may be configured to execute a command from that execution queue 340. If the command is to be executed on NAND memory 350 (e.g., a read command, a write command, or an erase command), then the command executor 345 may execute the command on the NAND memory 350.

The NAND memory 350 may include the memory 140 (e.g., a non-volatile memory portion of the memory 140) described above in connection with FIG. 1 and/or one or more non-volatile memory arrays 210 described above in connection with FIG. 2. Although some implementations are described herein in connection with NAND memory 350, implementations described herein are also applicable to other types of non-volatile memory, such as NOR memory.

Some implementations described herein enable fine-grained control and prioritization of memory command execution across different logical units and different command types. For example, the quantity of LUN queues 325 per LUN queue group 320 may be greater than the quantity of execution queues 340 included in the execution queue group 335 and/or the quantity of incoming command queues 305. This enables the memory device 120 to achieve finer-grained prioritization of commands than if LUN queues 325 were not used or if a quantity of LUN queues 325 per LUN queue group 320, was less than or equal to the quantity of execution queues 340 and/or incoming command queues 305. This finer-grained prioritization may enable the memory device 120 to satisfy quality of service (QoS) requirements, such as a maximum latency for a particular command type.

Furthermore, some implementations described herein reduce processing power needed to prioritize memory commands to achieve QoS requirements and/or to achieve load balancing across logical units. For example, the memory device 120 (e.g., the LUN scheduler 330) can select a command by selecting the next LUN queue group 320, selecting a next LUN queue 325 in that LUN queue group 320, and selecting the next command in that LUN queue 325 (e.g., an oldest command in that LUN queue 325 based on a first-in, first-out procedure), rather than consuming processing power to search through a long queue of commands to identify the next command to be transferred and/or executed. As a result, implementations described herein reduce processing power, conserve processing resources, and reduce power consumption.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more operations described as being performed by another set of components shown in FIG. 3.

FIG. 4 is a diagram illustrating an example memory architecture 400 that may be used by the memory device 120. The memory device 120 may use the memory architecture 400 to store data. As shown, the memory architecture 400 may include a die 410, which may include multiple planes 420. A plane 420 may include multiple blocks 430. A block 430 may include multiple pages 440. Although FIG. 4 shows a particular quantity of planes 420 per die 410, a particular quantity of blocks 430 per plane 420, and a particular quantity of pages 440 per block 430, these quantities may be different than what is shown. In some implementations, the memory architecture 400 is a NAND memory architecture.

The die 410 is a structure made of semiconductor material, such as silicon. In some implementations, a die 410 is the smallest unit of memory that can independently execute commands. A memory device 120 may include one or more dies 410. In some implementations, the memory device 120 may include multiple dies 410. In this case, multiples dies 410 may each perform a respective memory operation (e.g., a read operation, a write operation, or an erase operation) in parallel. For example, a controller 130 of the memory device 120 may be configured to concurrently perform memory operations on multiple dies 410 for parallel control.

Each die 410 of a memory device 120 includes one or more planes 420. A plane 420 is sometimes called a memory plane. In some implementations, identical and concurrent operations can be performed on multiple planes 420 (sometimes with restrictions). For example, a multi-plane command (e.g., a multi-plane read command or a multi-plane write command) may be executed on multiple planes 420 concurrently, whereas a single plane command (e.g., a single plane read command or a single plane write command) may be executed on a single plane 420. A logical unit of the memory device 120 may include one or more planes 420 of a die 410. In some implementations, a logical unit may include all planes 420 of a die 410 and may be equivalent to a die 410. Alternatively, a logical unit may include fewer than all planes 420 of a die 410. A logical unit may be identified by a logical unit number (LUN). Depending on the context, the term "LUN" may refer to a logical unit or an identifier (e.g., a number) of that logical unit.

Each plane 420 includes multiple blocks 430. A block 430 is sometimes called a memory block. Each block 430 includes multiple pages 440. A page 440 is sometimes called a memory page. A block 430 is the smallest unit of memory that can be erased. In other words, an individual page 440 of a block 430 cannot be erased without erasing every other page 440 of the block 430. A page 440 is the smallest unit of memory to which data can be written (i.e., the smallest unit of memory that can be programmed with data). The terminology "programming" memory and "writing to" memory may be used interchangeably. A page 440 may include multiple memory cells that are accessible via the same access line (sometimes called a word line).

In some implementations, read and write operations are performed for a specific page 440, while erase operations are performed for a block 430 (e.g., all pages 440 in the block 430). In some implementations, to prevent wearing out of memory, all pages 440 of a block 430 may be programmed before the block 430 is erased to enable a new program operation to be performed to a page 440 of the block 430. After a page 440 is programmed with data (called "old data" below), that data can be erased, but that data cannot be overwritten with new data prior to being erased. The erase operation would erase all pages 440 in the block 430, and erasing the entire block 430 every time that new data is to replace old data would quickly wear out the memory cells of the block 430. Thus, rather than performing an erase operation, the new data may be stored in a new page (e.g., an empty page), as shown by reference number 450, and the old page that stores the old data may be marked as invalid, as shown by reference number 460. The memory device 120 may then point operations associated with the data to the new page (e.g., in an address table) and may track invalid pages to prevent program operations from being performed on invalid pages prior to an erase operation.

When a block 430 satisfies an erasure condition, the memory device 120 may select the block 430 for erasure, copy the valid data of the block 430 (e.g., to a new block 430 or to the same block 430 after erasure), and erase the block 430. For example, the erasure condition may be that all pages 440 of the block 430 or a threshold quantity or percentage of pages 440 of the block 430 are unavailable for further programming (e.g., are either invalid or already store valid data). As another example, the erasure condition may be that a quantity or percentage of free pages 440 of the block 430 (e.g., pages 440 that are available to be written) is less than or equal to a threshold. The process of selecting a block 430 satisfying an erasure condition, copying valid pages 440 of that block 430 to a new block 430 (or the same block 430 after erasure), and erasing the block 430 is sometimes called garbage collection and is used to free up memory space of the memory device 120.

As indicated above, FIG. 4 is provided as an example. Other examples may differ from what is described with regard to FIG. 4.

FIG. 5 is a diagram of an example prioritization of memory command types. FIG. 5 shows a table with example memory command types and corresponding execution priority levels and intra-LUN priority levels. In FIG. 5, a larger number for a priority level indicates a higher priority. For example, a priority level of 3 (e.g., EP3 or ILP3, as shown) indicates a higher priority command type than a priority level of 2 (e.g., EP2 or ILP2, as shown).

An execution priority level (shown as EP in FIG. 5) may indicate a priority of a command within an execution queue group compared to other commands within the execution queue group. For example, each execution queue within the execution queue group may be associated with a different execution priority level that indicates a priority of that execution queue compared to every other execution queue included in the execution queue group. Because each execution queue stores a command type (or a set of command types), the execution priority level may indicate priority of that command type (or set of command types) compared to other command types in the execution queue group. In some implementations, the execution priority level is used for selecting a command from the execution queue group for execution.

An intra-LUN priority level (shown as ILP in FIG. 5) may indicate a priority of a command within a LUN queue group compared to other commands within the LUN queue group. For example, each LUN queue within a LUN queue group may be associated with a respective intra-LUN priority level that indicates a priority of that LUN queue compared to every other LUN queue included in the LUN queue group. In some implementations, each LUN queue within a LUN queue group is associated with a different intra-LUN priority level than every other LUN queue included in the LUN queue group. However, in some implementations, two or more LUN queues may share the same intra-LUN priority level. Because each LUN queue stores a command type (or a set of command types), the intra-LUN priority level may indicate priority of that command type (or set of command types) compared to other command types in the same LUN queue group. In some implementations, the intra-LUN priority level is used for selecting a LUN queue, within a LUN queue group, from which a command is to be transferred to the execution queue group.

In some implementations, a LUN queue (e.g., each LUN queue) may be associated with both an intra-LUN priority level and an execution priority level. An execution priority level associated with a LUN queue may indicate a priority for execution of commands in that LUN queue compared to every other command across all LUN queues in all LUN queue groups. In other words, an intra-LUN priority level may indicate a local priority for commands within a LUN queue group, whereas an execution priority level may indicate a global priority for commands across all LUN queue groups. An intra-LUN priority level may be used to select a next command for transfer from a LUN queue group to the execution queue group, and the execution priority level may be used to select a next command from the execution queue group for execution.

In some implementations, a quantity of intra-LUN priority levels (e.g., within a LUN queue group) used by the memory device 120 is greater than a quantity of execution priority levels (e.g., within the execution queue group) used by the memory device 120. Similarly, a quantity of LUN queues (e.g., within a LUN queue group) used by the memory device 120 may be greater than a quantity of execution queues (e.g., within the execution queue group) used by the memory device 120. In the example of FIG. 5, the quantity of execution priority levels is four (shown as EP0, EP1, EP2, and EP3), and the quantity of intra-LUN priority levels is equal to five plus a quantity of memory planes associated with a LUN (e.g., associated with a logical unit). In this case, if a logical unit includes six memory planes, then the quantity of intra-LUN priority levels is eleven, shown as a priority level of ILP0, a priority level of ILP1, a priority level of ILP2, a priority level of ILP3, multiple priority levels of ILP(Y) (e.g., including a priority level of ILP(3+N)), and a priority level of ILP(4+N). In this example, N is equal to the number of memory planes included in a logical unit, and Y is a value that is greater than three and less than 4+N. For six memory planes, N would be equal to 6, and the highest intra-LUN priority level would be ILP10. The multiple priority levels of ILP(Y) would be ILP4, ILP5, ILP6, ILP7, ILP8, and ILP9. In some implementations, the quantity of intra-LUN priority levels is at least two more than the quantity of execution priority levels. For example, if the memory device 120 uses four execution priority levels, then the memory device 120 may use at least six intra-LUN priority levels.

Using a greater quantity of intra-LUN priority levels than execution queue priority levels enables the memory device 120 to have finer-grained control over memory command prioritization than if the memory device 120 were to use only execution queue priority levels or if the memory device 120 were to use a quantity of intra-LUN priority levels that is less than or equal to the quantity of execution priority levels. Furthermore, the memory device 120 may use a less processor intensive technique to identify a next command (e.g., a round robin technique and/or a first-in, first-out technique) for transfer to an execution queue and/or for execution as compared to a more processor intensive technique, such as a command queue lookahead technique, that would otherwise need to be used to achieve equivalent prioritization of commands if only execution queue priority levels were used or if the memory device 120 were to use a quantity of intra-LUN priority levels that is less than or equal to the quantity of execution priority levels.

As shown by reference number 505, in the example of FIG. 5, host read commands have the highest execution priority level relative to other memory commands. In the example of FIG. 5, host read commands, including both multi-plane host read commands and single plane host read commands, are associated with an execution priority level of EP3. A host read command may be a read command that is received from the host device 110. For example, the host read command may be generated by and/or received from a host device 110 that is in communication with the memory device 120. In some implementations, the host read command is received by the memory device 120 via the host interface 150. The host read command may be a command instructing the memory device 120 to read data from the memory 140 and provide that data to the host device 110 (e.g., via the host interface). In some implementations, the controller 130 may determine that a read command is a host read command based on the read command being received from the host device 110, based on the read command being received via the host interface 150 (e.g., a particular interface and/or pin of the memory device 120), based on the read command not being generated internally by the memory device 120, and/or based on the read command including a particular value or instruction (e.g., an instruction to read data from the memory 140 and provide that data to the host device 110).

In the example of FIG. 5, multi-plane host read commands and single plane host read commands have different intra-LUN priority levels. Furthermore, single plane host read commands for different planes of a logical unit have different intra-LUN priority levels.

For example, as shown by reference number 510, in the example of FIG. 5, multi-plane host read commands have the highest intra-LUN priority level relative to other memory commands (including every single plane host read command). In the example of FIG. 5, multi-plane host read commands are associated with an intra-LUN priority level of 4+N, where N is the quantity of planes included in a logical unit. A multi-plane host read command is a host read command to read data that is stored in more than one memory plane of the memory device 120. For example, a first portion of the data may be stored in a first memory plane, a second portion of the data may be stored in a second memory plane, and so on.

As shown by reference number 515, in the example of FIG. 5, single plane host read commands have a lower intra-LUN priority level than multi-plane host read commands and a higher intra-LUN priority level than all other commands. Each plane of a logical unit may be associated with a different intra-LUN priority level. For example, a first plane of the logical unit (and first single plane host read commands for that first plane) may be associated with an intra-LUN priority level of ILP9 (e.g., 3+N, where N=6), a second plane of the logical unit (and second single plane host read commands for that second plane) may be associated with an intra-LUN priority level of ILP8 (e.g., 3+N−1, where N=6), a third plane of the logical unit (and third single plane host read commands for that third plane) may be associated with an intra-LUN priority level of ILP7 (e.g., 3+N−2, where N=6), and so on. A single plane host read command is a command to read data that is stored in a single memory plane included in a logical unit.

As shown by reference number 520, in the example of FIG. 5, write commands and erase commands have the second-highest execution priority level relative to other commands, shown as an execution priority level of EP2. For example, write commands and erase commands may have a lower execution priority level than host read commands (e.g., both multi-plane host read commands and single plane host read commands) and a higher execution priority level than all other commands. In some implementations, write commands and erase commands have a same execution priority level because the memory device 120 may prevent execution of a write command on a memory block while that memory block is being erased, and may prevent execution of an erase command on a memory block while that memory block is being written.

In the example of FIG. 5, write commands and erase commands have different intra-LUN priority levels. In some implementations, write commands have a higher intra-LUN priority level than erase commands. For example, as shown by reference number 525, in the example of FIG. 5, write commands are associated with an intra-LUN priority level of ILP3, which is a higher intra-LUN priority level than erase commands and a lower intra-LUN priority level than host read commands (e.g., both multi-plane and singe plane). As shown by reference number 530, in the example of FIG. 5, erase commands are associated with an intra-LUN priority level of ILP0, which is the lowest intra-LUN priority level.

An erase command may include a command to erase a block of memory. A write command may include a host write command or a non-host write command. A host write command is a write command received from a host device 110, such as a command from a host device 110 to write data to memory. A non-host write command is a write command that is not received from the host device 110. For example, a non-host write command may be generated internally by the memory device 120. A non-host write command may include, for example, a garbage collection (GC) write command, a flash translation layer (FTL) write command, a file system area (FSA) write command, or a redundant array of independent NAND (RAIN) write command. A GC write command may include a command to write valid data from a first block of memory to a second block of memory, such as prior to erasing the first block of memory. An FTL write command may include a command to write an address table and/or a translation table (e.g., a physical to logical translation table, block address table, and/or a logical block address table) to non-volatile memory (e.g., from volatile memory). An FSA write command may include a command to write log data (e.g., a log file) to memory. A RAIN write command may include a command to write RAIN parity bits to memory.

As shown by reference number 535, in the example of FIG. 5, non-host read commands may have a lower execution priority level than write commands and erase commands, shown as an execution priority level of EP1 for some non-host read commands and an execution priority level of EP0 (e.g., lowest priority) for other non-host read commands. A non-host read command is a read command that is not received from the host device 110. For example, a non-host read command may be generated internally by the memory device 120. A non-host read command may include, for example, a GC read command, a data integrity scan read command, an FTL read command, or an FSA read command.

As shown by reference number 540, in the example of FIG. 5, GC read commands have the third-highest (or second-lowest) execution priority level relative to other memory commands, shown as an execution priority level of EP1. For example, GC read commands may have a lower execution priority level than host read commands (e.g., both multi-plane and single plane), write commands, and erase commands, and may have a higher execution priority level than all other memory commands. As further shown, in the example of FIG. 5, GC read commands may have an intra-LUN priority level of ILP2, which is a lower intra-LUN priority level than host read commands (e.g., both multi-plane and single plane) and write commands and a higher intra-LUN priority level than all other memory commands (e.g., erase commands, non-host, non-GC read commands, and non-read, non-write, non-erase commands). A GC read command may include a command to read valid data from a first block of memory so that the valid data can be written to a second block of memory, such as prior to erasing the first block of memory.

As shown by reference number 545, in the example of FIG. 5, non-host, non-GC read commands have the fourth-highest (or lowest) execution priority level relative to other memory commands, shown as an execution priority level of EP0. For example, non-host, non-GC read commands may have a lower execution priority level than host read commands (e.g., both multi-plane and single plane), write commands, erase commands, and GC read commands, and may have the same execution priority level as non-read, non-write, non-erase commands. As further shown, in the example of FIG. 5, non-host, non-GC read commands may have an intra-LUN priority level of ILP1, which is a lower intra-LUN priority level than host read commands (e.g., both multi-plane and single plane), write commands, and GC read commands and a higher intra-LUN priority level than all other memory commands (e.g., erase commands and non-read, non-write, non-erase commands)

A non-host, non-GC read command may include, for example, a data integrity scan read command, an FTL read command, or an FSA read command. A data integrity scan read command may include a command to read data from memory for data verification and/or error checking. An FTL read command may include a command to read an address table and/or a translation table (e.g., a physical to logical translation table, block address table, and/or a logical block address table) from non-volatile memory. An FSA read command may include a command to read log data (e.g., a log file) from memory.

As shown by reference number 550, in the example of FIG. 5, non-read, non-write, non-erase commands have the fourth-highest (or lowest) execution priority level relative to other memory commands, shown as an execution priority level of EP0. Thus, in some implementations, non-host, non-GC read commands (described above) and non-read, non-write, non-erase commands have the same execution priority level, shown as EP0. As further shown, in the example of FIG. 5, non-read, non-write, non-erase commands may have an intra-LUN priority level of ILP0, which is the lowest intra-LUN priority level. A non-read, non-write, non-erase command is sometimes called an out-of-band (OOB) command. In some implementations, OOB commands have the same intra-LUN priority level as erase commands. An OOB command may include an command that is not executed on a memory array of the memory device 120 (e.g., that does not write data to a memory array, does not read data from a memory array, and does not erase a memory array). For example, an OOB command may include a request to obtain a unique identifier of the memory device 120, a request for on-demand paging (ODP), a request to obtain a temperature of the memory device 120, and/or an administrative command (e.g., a request to get a feature or a request to set a feature).

As shown by reference number 555, the memory device 120 may place a command into a LUN queue (e.g., for a particular LUN and/or within a LUN queue group for that particular LUN) based on a command type of the command. The LUN queues may include, for example, a multi-plane host read LUN queue, multiple single plane host read LUN queues (e.g., one single plane host read LUN queue for each plane associated with the particular LUN), a write LUN queue, a GC read LUN queue, a non-host, non-GC read LUN queue, and/or an OOB LUN queue. As described above and as shown in FIG. 5, in some implementations, the multi-plane host read LUN queue and the multiple single plane host read LUN queues are associated with a first execution priority level (shown as EP3), the write LUN queue is associated with a second execution priority level (shown as EP2), the GC read LUN queue is associated with a third execution priority level (shown as EP1), and the non-host, non-GC read LUN queue is associated with a fourth execution priority level (shown as EP0).

As shown, multi-plane host read commands may be placed into the multi-plane host read LUN queue, single plane host read commands for a particular plane may be placed into the single plane host read LUN queue for that particular plane, write commands may be placed into a write LUN queue, GC read commands may be placed into the GC read LUN queue, non-host, non-GC read commands (e.g., non-host read commands other than GC read commands) may be placed into the non-host, non-GC read LUN queue, and OOB commands may be placed into the OOB LUN queue. As shown by reference number 560, in some implementations, erase commands may be placed into the OOB LUN queue. Thus, in some implementations, the OOB LUN queue may be for erase commands and non-erase commands and may be called a non-read, non-write LUN queue (e.g., rather than a non-read, non-write, non-erase LUN queue) because the OOB commands are not read commands and are not write commands. In some implementations, the erase commands in the OOB LUN queue are associated with the second execution priority level (shown as EP2), and the non-erase commands in the OOB LUN queue are associated with the fourth execution priority level (shown as EP0).

As shown by reference number 565, the memory device 120 may transfer a command into an execution queue based on a LUN queue from which the command is transferred and/or based on a command type of the command. The execution queues may include, for example, a host read execution queue, a write and erase execution queue, a GC read execution queue, and/or an OOB and non-host, non-GC read execution queue (sometimes called a low priority execution queue).

As shown, multi-plane host read commands may be transferred from the multi-plane host read LUN queue to the host read execution queue, single plane host read commands may be transferred from a corresponding single plane host read LUN queue to the host read execution queue, write commands may be transferred from the write LUN queue to the write and erase execution queue, GC read commands may be transferred from the GC read LUN queue to the GC read execution queue, non-host, non-GC read commands may be transferred from the non-host, non-GC read LUN queue to the OOB and non-host, non-GC read execution queue, and OOB commands may be transferred from the OOB LUN queue to the OOB and non-host, non-GC read execution queue. As shown by reference number 570, erase commands may be transferred from the OOB LUN queue to the write and erase execution queue.

As indicated above, FIG. 5 is provided as an example. Other examples may differ from what is described with regard to FIG. 5.

FIGS. 6A-6D are diagrams of an example 600 of using LUN queues and LUN queue scheduling. The operations described in connection with FIGS. 6A-6D may be performed by the memory device 120 and/or one or more components of the memory device 120, such as the controller 130 and/or one or more components of the controller 130.

Figure 6A:
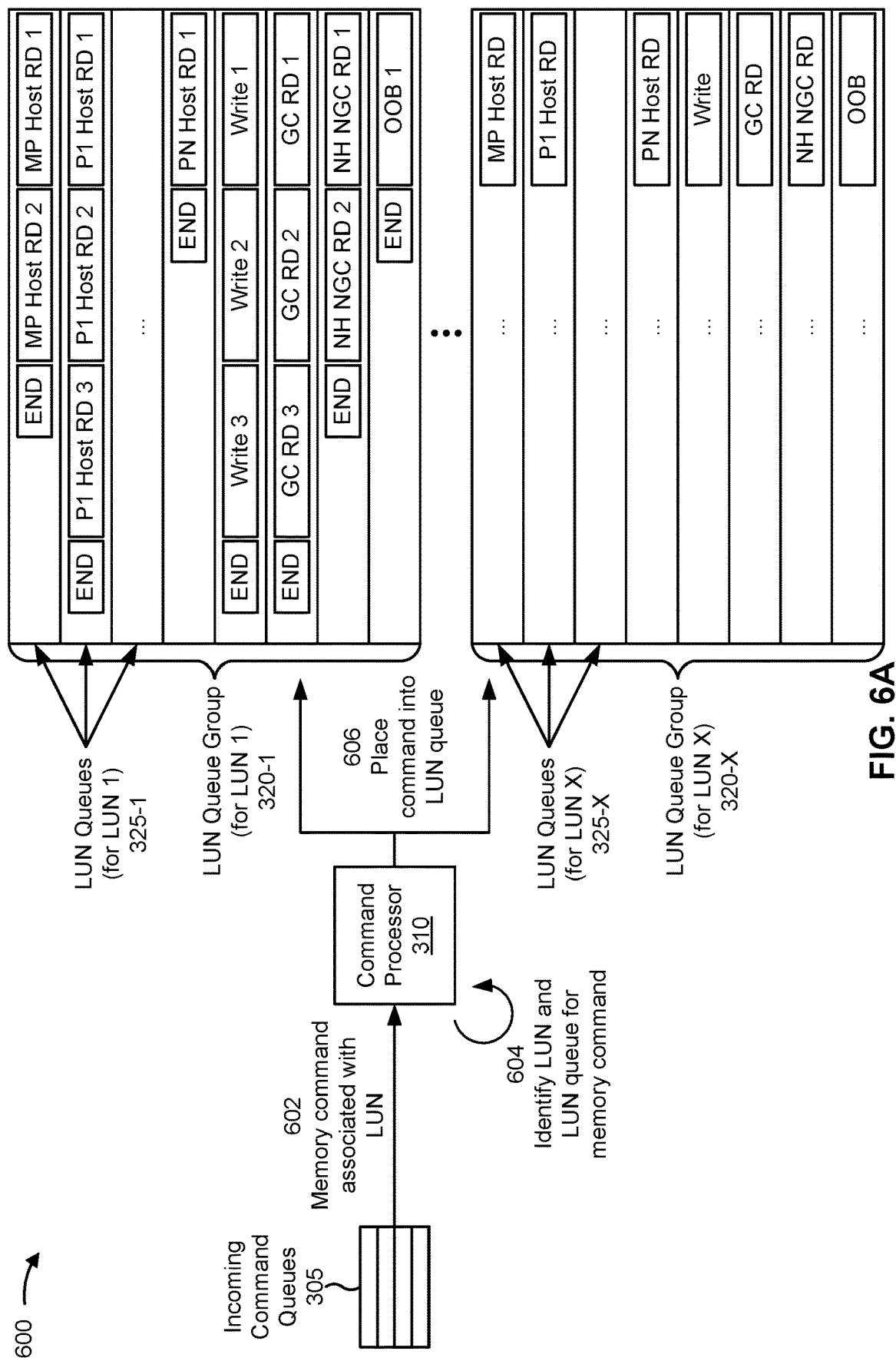
FIGS. 6A-6D are diagrams of an example of using LUN queues and LUN queue scheduling.

As shown in FIG. 6A, and by reference number 602, the command processor 310 may receive a memory command associated with a LUN. For example, the command processor 310 may receive and/or obtain the memory command from an incoming command queue 305, as described elsewhere herein. In some implementations, the incoming command queue 305 is part of an incoming command queue group that stores commands regardless of a LUN associated with those commands.

As shown by reference number 604, the command processor 310 may identify a LUN and a LUN queue for the memory command. In some implementations, the LUN associated with the command may be indicated in the command. For example, the command may include a logical block address (LBA) or another type of indicator that indicates a LUN associated with the command. In some implementations, the memory device 120 may store a LUN mapping table that stores multiple entries, where each entry indicates a correspondence between a LUN and a set of LBAs included in that LUN. In this case, the command processor 310 may look up an LBA, indicated in the command, to identify an entry that indicates the LBA and may determine the LUN indicated in that entry. When a command is associated with a LUN, the command may be performed on the LUN (e.g., on one or more planes of the LUN, one or more blocks of the LUN, one or more pages of the LUN, and/or one or more memory cells of the LUN) when the command is executed. For example, a read command associated with a LUN may read data from the LUN, a write command associated with a LUN may write data to the LUN, an erase command associated with a LUN may erase a block of the LUN, and so on.

The command processor 310 may identify a LUN queue group based on the identified LUN. For example, each LUN may be associated with a respective LUN queue group, as described elsewhere herein. Thus, the command processor 310 may identify a LUN queue group that corresponds to the identified LUN.

After identifying the LUN queue group, the command processor 310 may identify a LUN queue, within the identified LUN queue group, into which the command is to be placed. For example, the command processor 310 may identify the LUN queue based on one or more parameters associated with the command, such as a command type associated with the command and/or a memory plane associated with the command, as described above in connection with FIG. 5. For example, the command processor 310 may identify the LUN queue for placement of the memory command based on a command type of the memory command, such as whether the memory command is a read command, a write command, an erase command, or an out-of-band command, based on whether the command is a host command or a non-host command, and/or based on whether the memory command is a multi-plane command or a single plane command, as described above in connection with FIG. 5.

Additionally, or alternatively, the command processor 310 may identify the LUN queue based on a memory plane associated with the command. For example, if the command processor 310 determines that the memory command is a single plane command (e.g., a single plane read command), then the command processor 310 may identify a memory plane associated with the command. For example, the command may include an LBA or another type of indicator that indicates a memory plane associated with the command. In some implementations, the memory device 120 may store a memory plane mapping table that stores multiple entries, where each entry indicates a correspondence between a memory plane and a set of LBAs included in that memory plane. In this case, the command processor 310 may look up an LBA, indicated in the command, to identify an entry that indicates the LBA and may determine the memory plane indicated in that entry. When a command is associated with a memory plane, the command may be performed on the memory plane (e.g., one or more blocks of the plane, one or more pages of the plane, and/or one or more memory cells of the plane) when the command is executed. For example, a read command associated with a plane may read data from the plane, a write command associated with a plane may write data to the plane, an erase command associated with a plane may erase a block of the plane, and so on. In some implementations, the command processor 310 may identify the command type and/or the memory plane for a command based on information included in the command, such as an instruction, a command header, and/or a command type identifier.

As shown by reference number 606, the command processor 310 may place the command in the identified LUN queue (e.g., corresponding to the command type of the command) of the identified LUN queue group (e.g., corresponding to the LUN associated with the command). In some implementations, a LUN queue may store commands for processing in a first-in, first-out (FIFO) manner in which commands are pulled from the LUN queue in the same order in which they were placed in the LUN queue (e.g., an oldest command that has been in the LUN queue longest or that was placed in the LUN queue first will be the first command pulled from that LUN queue at a later time).

In some implementations, the command processor 310 may place (e.g., add) the command into a LUN queue based on determining that a quantity of memory commands, pending across all LUN queue groups of the memory device 120, is less than a threshold, such as a maximum intermediate command threshold. A maximum intermediate command threshold may by stored by the memory device 120 and/or may indicate a maximum quantity of commands permitted to be stored across all LUN queue groups of the memory device 120. In other words, the maximum intermediate command threshold may indicate a maximum quantity of commands permitted to be stored across all LUN queues of all LUN queue groups of the memory device 120. If the command processor 310 determines that the quantity of memory command does not satisfy the maximum intermediate command threshold (e.g., is less than the threshold), then the command processor 310 may place the received memory command into a LUN queue.

However, if the command processor 310 determines that the quantity of memory commands satisfies the maximum intermediate command threshold (e.g., is greater than or equal to the threshold), then the command processor 310 may refrain from placing the received memory command into a LUN queue. In this case, the command processor 310 may wait until one or more commands have been transferred from a LUN queue to an execution queue, which reduces the quantity of commands stored across all LUN queue groups. In some implementations, the memory device 120 may store a counter, such as an intermediate commands counter. The memory device 120 may increment a value of the counter when a command is placed in a LUN queue and may decrement a value of the counter when a command is transferred from a LUN queue to an execution queue. The command processor 310 may determine a value of the counter prior to placing a command in a LUN queue, and may compare the counter value with the maximum intermediate command threshold to determine whether to place the command in a LUN queue. In this way, the amount of storage space needed for LUN queues (e.g., across all LUN queue groups) can be reduced (e.g., as compared to not using a maximum intermediate command threshold).

In the example of FIG. 6A, LUN 1 is associated with a LUN queue group 320-1, which includes multiple LUN queues 325-1. As shown, in the LUN queue group 320-1, a multi-plane host read LUN queue includes two multi-plane host read commands (shown as MP Host RD 1 and MP Host RD 2), a single plane host read LUN queue for plane 1 includes three single plane host read commands for plane 1 (shown as P1 Host RD 1, P1 Host RD 2, and P1 Host RD 3), a single plane host read LUN queue for plane N includes one single plane host read command for plane N (shown as PN Host RD), a write LUN queue includes three write commands (shown as Write 1, Write 2, and Write 3), a GC read LUN queue includes three GC read commands (shown as GC RD 1, GC RD 2, and GC RD 3), a non-host, non-GC read LUN queue includes two non-host, non-GC read commands (shown as NH NGC RD 1 and NH NGC RD2), and an OOB LUN queue includes one OOB command (shown as OOB 1). In FIG. 6A, "END" indicates the end of a queue. As further shown, one or more other LUNs may be associated with a corresponding one or more LUN queue groups. For example, LUN X is associated with a LUN queue group 320-X, which includes multiple LUN queues 325-X.

Figure 6B:
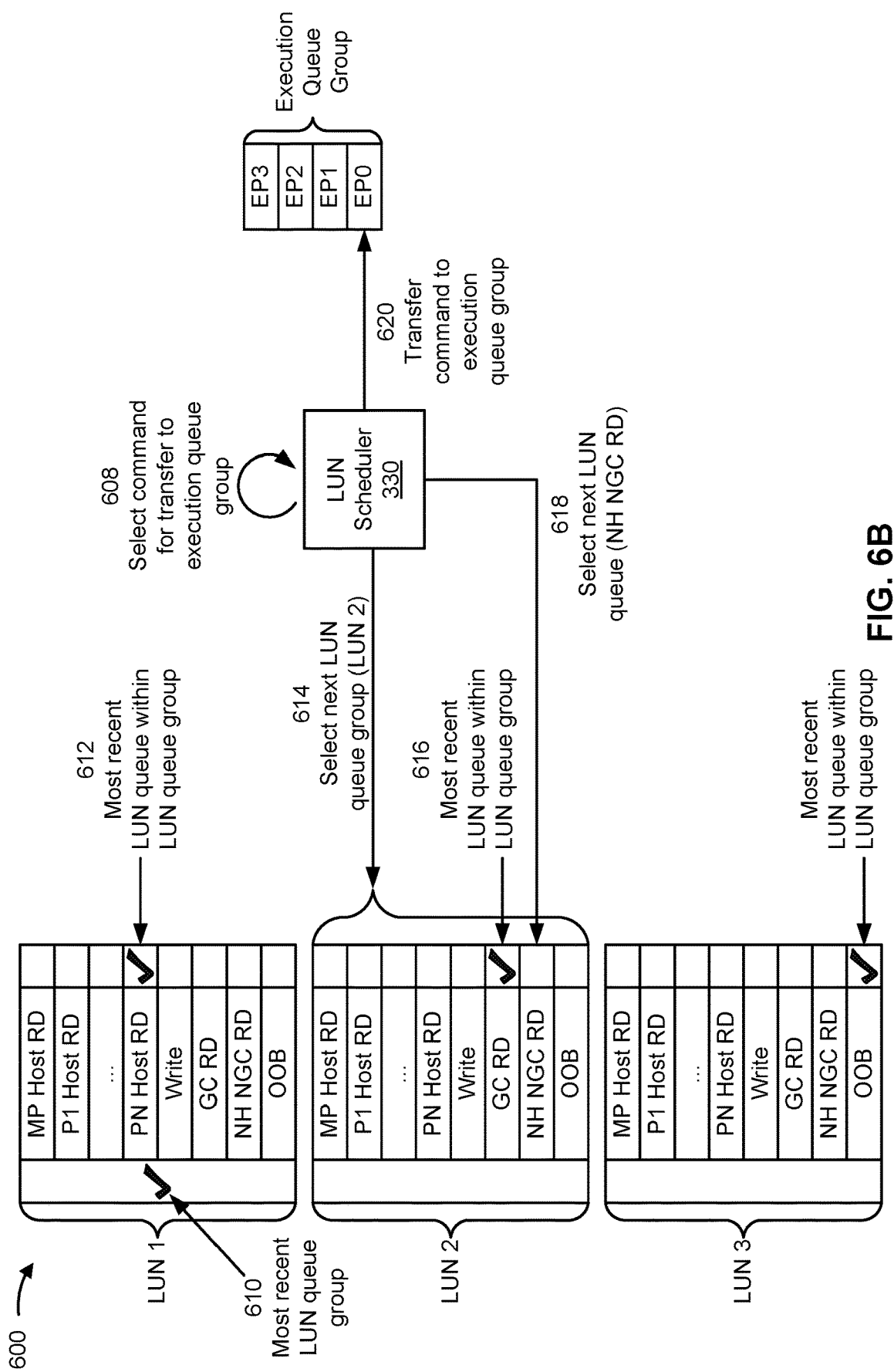

As shown in FIG. 6B, and by reference number 608, the LUN scheduler 330 may select a command to be transferred from a LUN queue and/or a LUN queue group to the execution queue group (and/or an execution queue). Selecting a command to be transferred is sometimes called selecting a "next command." To identify and/or select the next command, the LUN scheduler 330 may first select a LUN queue group (sometimes called a "next LUN queue group") from which the next command is to be transferred to the execution queue group. The LUN scheduler 330 may select the next LUN queue group based on a most recently selected LUN queue group from which an immediately preceding command was selected and/or transferred to the execution queue group. An "immediately preceding command" may refer to a most recently transferred command, across all LUN queue groups, that was transferred to the execution queue group.

As shown by reference number 610, in example 600, the most recently selected LUN queue group is LUN queue group 1 associated with LUN 1. As also shown by reference number 610, the memory device 120 may store a LUN queue group indication (e.g., shown as a checkmark) of the most recently selected LUN queue group based on transferring the immediately preceding command to the execution queue group. In example 600, the LUN queue group indication indicates that LUN queue group 1 is the most recently selected LUN queue group. The LUN scheduler 330 may select the next LUN queue group based on based on the LUN queue group indication. For example, the LUN scheduler 330 may select LUN queue group 2 based on the LUN queue group indication indicating LUN queue group 1. In example 600, the immediately preceding command selected by the LUN scheduler 330 is a command from the single plane host read LUN queue, of LUN queue group 1, associated with plane N (shown as PN) of LUN 1, as shown by reference number 612.

As shown by reference number 614, because the most recently selected LUN queue group is LUN queue group 1, the LUN scheduler 330 selects LUN queue group 2, associated with LUN 2, as the next LUN queue group. In some implementations, the LUN scheduler 330 may cycle through LUN queue groups sequentially in this manner by selecting a command from LUN 1, selecting a command from LUN 2, selecting a command from LUN 3, and so on until cycling back to LUN 1 again.

After selecting a LUN queue group (e.g., the next LUN queue group, such as LUN 2 in example 600), the LUN scheduler 330 may select a LUN queue (sometimes called a "next LUN queue") within the selected LUN queue group. In some implementations, the LUN scheduler 330 may select the next LUN queue within a selected LUN queue group based on a most recently selected LUN queue in the selected LUN queue group. A most recently selected LUN queue, within the selected LUN queue group, may refer to a LUN queue from which a most recently transferred command from the selected LUN queue group was transferred to the execution queue group (e.g., during the previous instance that the LUN queue group was selected).

In example 600, the most recently selected LUN queue within LUN queue group 2 is a GC read LUN queue, as shown by reference number 616. This means that the last time that the LUN scheduler 330 selected LUN queue group 2 (e.g., a most recent selection of LUN queue group 2 before the current selection of LUN queue group 2), the LUN scheduler 330 transferred a command from the GC read LUN queue of LUN queue group 2. As also shown by reference number 616, the memory device 120 may store a LUN queue indication (e.g., shown as a checkmark) of the most recently selected LUN queue (e.g., within a LUN queue group) based on transferring a command from the LUN queue group to the execution queue group. In example 600, the LUN queue indication indicates that the GC read queue (shown as GC RD) is the most recently selected LUN queue within LUN queue group 2. The LUN scheduler 330 may select the next LUN queue from the selected LUN queue group based on based on the LUN queue indication. For example, the LUN scheduler 330 may select the non-host, non-GC read LUN queue (shown as NH GC RD) based on the LUN queue indication indicating the GC read queue.

As shown by reference number 618, because the most recently selected LUN queue within LUN queue group 2 is the GC read LUN queue, the LUN scheduler 330 selects the non-host, non-GC read LUN queue as the next LUN queue within LUN queue group 2. In some implementations, the LUN scheduler 330 may cycle through LUN queues, within a LUN queue group, sequentially in this manner by selecting, in each successive instance that the LUN queue group is selected, a command from the multi-plane host read LUN queue of the LUN queue group, the first single plane host read LUN queue of the LUN queue group, the second single plane host read LUN queue of the LUN queue group (and so on for each single plane host read LUN queue in the LUN queue group), the write LUN queue of the LUN queue group, the GC read LUN queue of the LUN queue group, the non-host, non-GC read LUN queue of the LUN queue group, and the OOB LUN queue of the LUN queue group. In some implementations, the LUN scheduler 330 may select a command from a single LUN queue of the LUN queue group each time that the LUN queue group is selected.

In some implementations, the LUN scheduler 330 may use a round robin technique to select commands from LUN queues. For example, the LUN scheduler 330 may select a single command from a LUN queue, included in a LUN queue group, may then select a single command from the next LUN queue in that LUN queue group (e.g., the next time that LUN queue group is selected), and so on. Alternatively, the LUN scheduler 330 may use a weighted round robin technique to select commands from LUN queues. For example, the LUN scheduler 330 may select a single command from a LUN queue, included in a LUN queue group, may then select multiple commands from the next LUN queue in that LUN queue group (e.g., the next time that LUN queue group is selected) depending on a weight associated with the next LUN queue, and so on. In some implementations, the multiple commands may be selected during a single selection of the LUN queue group (e.g., multiple commands may be transferred from a particular LUN queue of that LUN queue group before selecting a next LUN queue group). Alternatively, a first command may be selected from a LUN queue of the LUN queue group during a first selection of the LUN queue group, a second command may be selected from that same LUN queue of the LUN queue group during a second (e.g., next) selection of the LUN queue group, and so on. This may enable fine-grained control of command prioritization.

In some implementations, if the selected LUN queue is empty (e.g., does not include or store any commands), then the LUN scheduler 330 may select a next LUN queue. For example, the LUN scheduler 330 may select the next LUN queue from the currently selected LUN queue group (e.g., LUN queue group 2 in example 600), such as by selecting the OOB LUN queue of LUN queue group 2. This may assist with load balancing across LUNs (e.g., by not skipping LUN 2). Alternatively, the LUN scheduler 330 may select the next LUN queue from a next LUN queue group, such as by selecting LUN queue group 3 in example 600. This may assist with improved resource utilization across LUNs, such as by skipping a LUN associated with a relatively low quantity of commands.

As shown by reference number 620, the LUN scheduler 330 may transfer a command from the selected LUN queue to the execution queue group. In example 600, after selecting the non-host, non-GC read LUN queue of LUN queue group 2, the LUN scheduler 330 transfers a command from the non-host, non-GC read LUN queue (e.g., a non-host, non-GC read command) to the execution queue group. In some implementations, the LUN scheduler 330 may select an execution queue, within the execution queue group, to which the command is to be transferred based on a LUN queue from which the command is transferred and/or a command type of the command. In example 600, the LUN scheduler 330 selects execution queue EP0 (e.g., associated with execution priority level EP0), for the non-host, non-GC read command, as described above in connection with FIG. 5. In some implementations, each command type may be associated with a single execution priority queue (and a single execution priority level), as also described above in connection with FIG. 5. Thus, the LUN scheduler 330 may determine a command type of the command to be transferred and may select an execution queue to which the command is to be transferred based on the command type.

In some implementations, a LUN queue may be associated with a single execution queue (and a single execution priority level), such as a multi-plane host read LUN queue, a single plane host read LUN queue, a write LUN queue, a GC read LUN queue, and a non-host, non-GC read LUN queue, as described above in connection with FIG. 5. However, in some implementations, a LUN queue may be associated with multiple execution queues (and multiple execution priority levels), such as the OOB LUN queue, which is describe above in connection with FIG. 5 as being associated with an execution priority level of EP0 (e.g., for OOB commands) and an execution priority level of EP2 (e.g., for erase commands). In this case, the LUN scheduler 330 may select an execution queue to which the command is to be transferred based on the selected LUN queue for all LUN queues except for the OOB queue. For the OOB queue, the LUN scheduler 330 may select an execution queue to which the command is to be transferred based on the command type (and/or the LUN queue).

In some implementations, the LUN scheduler 330 may transfer a command to the execution queue group (e.g., an execution queue of the execution queue group) based on determining that an execution impact limit is not exceeded (e.g., is less than a threshold). The execution impact limit may by stored by the memory device 120. Each command may be associated with a corresponding execution impact that indicates, for example, a computational complexity of the command and/or an amount of time to execute the command. The LUN scheduler 330 may determine an execution impact of a command based on a command type of the command and/or a LUN queue that stores the command. For example, different command types may be associated with different execution impacts. The LUN scheduler 330 may determine a total group execution impact for the execution queue group based on a combination (e.g., a sum) of all individual execution impacts corresponding to each command stored in the execution queue group. Additionally, or alternatively, the LUN scheduler 330 may determine a total queue execution impact for an execution queue, included in the execution queue group, based on a combination (e.g., a sum) of all individual execution impacts corresponding to each command stored in the execution queue. In some implementations, the execution queue group may be associated with a group execution impact limit. Additionally, or alternatively, each execution queue (within the execution queue group) may be associated with a corresponding queue execution impact limit. In some implementations, different execution queues are associated with different queue execution impact limits.

If the LUN scheduler 330 determines that transferring a next command to the execution queue group would not cause a total execution impact of all commands in the execution queue group to exceed the execution impact limit, then the LUN scheduler 330 may transfer the next command to the execution queue. For example, if the LUN scheduler 330 determines that transferring a next command to the execution queue group would not cause the total group execution impact to exceed the group execution impact limit (e.g., if the group execution impact limit is used by the memory device 120) and if the command processor 310 determines that transferring the next command to an execution queue associated with the next command would not cause the total queue execution impact to exceed the queue execution impact limit for that execution queue (e.g., if the queue execution impact limit is used by the memory device 120), then the LUN scheduler 330 may transfer the next command to the execution queue.

However, if the LUN scheduler 330 determines that transferring a next command to the execution queue group would cause a total execution impact of all commands in the execution queue group to exceed the execution impact limit, then the LUN scheduler 330 may refrain from transferring the next command to the execution queue. For example, if the LUN scheduler 330 determines that transferring a next command to the execution queue group would cause the total group execution impact to exceed the group execution impact limit (e.g., if the group execution impact limit is used by the memory device 120) or if the command processor 310 determines that transferring the next command to an execution queue associated with the next command would cause the total queue execution impact to exceed the queue execution impact limit for that execution queue (e.g., if the queue execution impact limit is used by the memory device 120), then the LUN scheduler 330 may refrain from transferring the next command to the execution queue. In this case, the LUN scheduler 330 may wait until one or more commands in the execution queue group have been executed, which reduces the execution impact limit(s) associated with those one or more commands.

In some implementations, the memory device 120 may store a total group execution impact value (e.g., for the execution queue group) and/or a total queue execution impact value (e.g., for each execution queue). The memory device 120 may modify (e.g., increase) the total group execution impact value when a command is transferred to the execution queue group (e.g., based on an execution impact value of the transferred command) and may modify (e.g., decrease) the total group execution impact value when a command from the execution queue group is executed (e.g., based on an execution impact value of the executed command). Similarly, the memory device 120 may modify (e.g., increase) the total queue execution impact value for an execution queue when a command is transferred to that execution queue (e.g., based on an execution impact value of the transferred command) and may modify (e.g., decrease) the total queue execution impact value for an execution queue when a command from that execution queue is executed (e.g., based on an execution impact value of the executed command). In this way, the amount of storage space needed for execution queues can be reduced (e.g., as compared to not using execution impact limits).

Figure 6C:
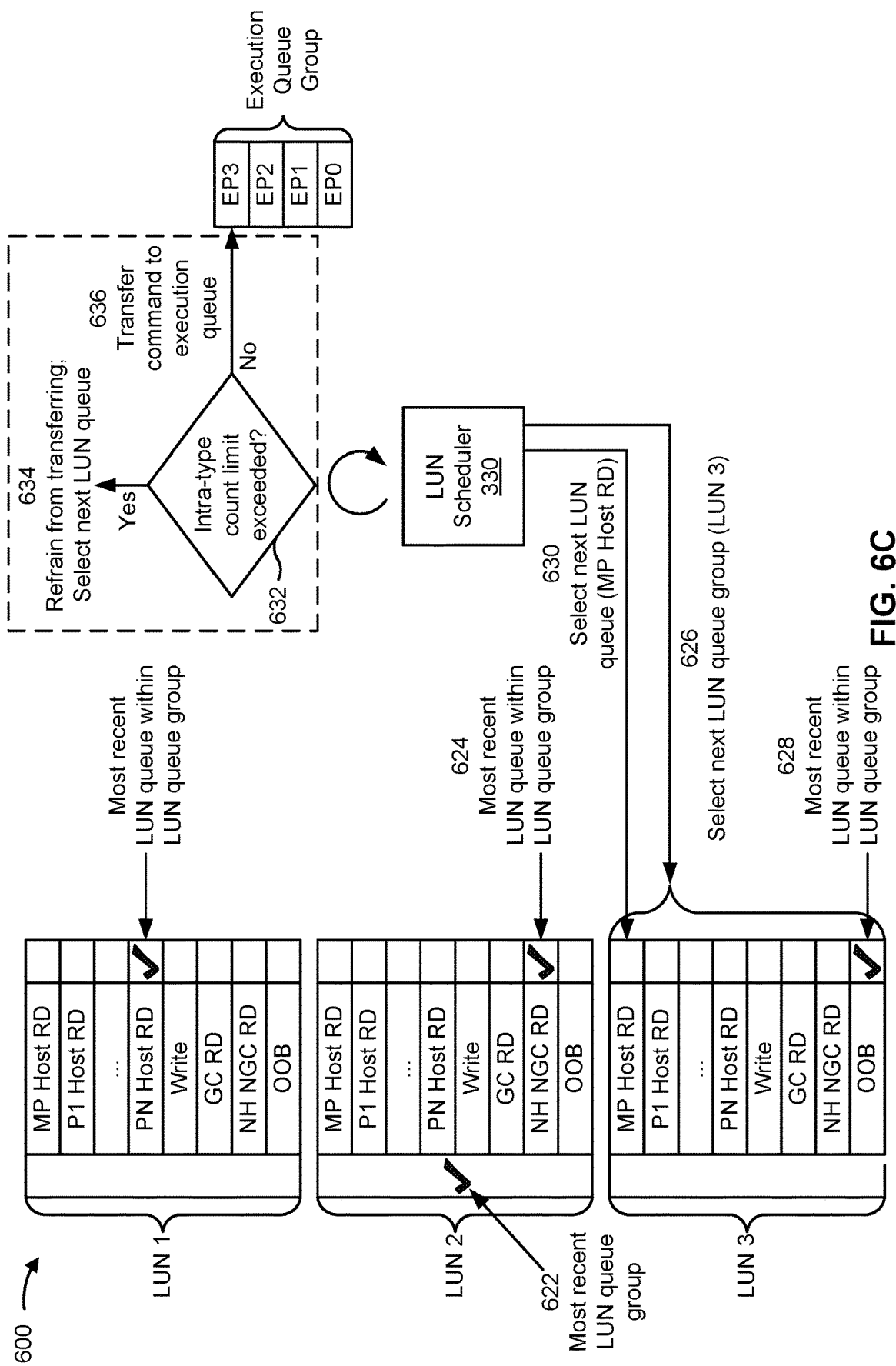

As shown in FIG. 6C, and by reference number 622, the memory device 120 may update the LUN queue group indication based on transferring a command to the execution queue group. For example, after transferring a non-host, non-GC read command from the non-host, non-GC read LUN queue of LUN queue group 2 (as described above in connection with FIG. 6B), the memory device 120 may update the LUN queue group indication to indicate that LUN queue group 2 is the most recently selected LUN queue group.

Similarly, as shown by reference number 624, the memory device 120 may update the LUN queue indication based on transferring a command to the execution queue group. For example, after transferring the non-host, non-GC read command from the non-host, non-GC read LUN queue of LUN queue group 2, the memory device 120 may update the LUN queue indication for LUN queue group 2 to indicate that the non-host, non-GC read LUN queue is the most recently selected LUN queue from LUN queue group 2. In some implementations, the memory device 120 may store a single LUN queue group indication, and may store a separate LUN queue indication for each LUN queue group.

As shown by reference number 626, because the most recently selected LUN queue group is LUN queue group 2 (e.g., as indicated by the LUN queue group indication), the LUN scheduler 330 selects LUN queue group 3, associated with LUN 3, as the next LUN queue group. In example 600, the most recently selected LUN queue within LUN queue group 3 (e.g., as indicated by the LUN queue indication for LUN queue group 3) is the OOB LUN queue, as shown by reference number 628. This means that the last time that the LUN scheduler 330 selected LUN queue group 3 (e.g., a most recent selection of LUN queue group 3 before the current selection of LUN queue group 3), the LUN scheduler 330 transferred a command from the OOB LUN queue of LUN queue group 3.

As shown by reference number 630, because the most recently selected LUN queue within LUN queue group 3 is the OOB LUN queue, the LUN scheduler 330 selects the multi-plane host read LUN queue as the next LUN queue within LUN queue group 3 (e.g., because the LUN scheduler cycles back to the multi-plane host read LUN queue after the OOB LUN queue).

As shown by reference number 632, in some implementations, the LUN scheduler 330 may determine whether transferring the selected command to the execution queue group would cause an intra-type count limit, associated with the selected command, to be exceeded for the execution queue group. In some implementations, the intra-type count limit may be specific to a selected LUN queue group, a selected LUN queue, and/or a command type of the selected command (e.g., from the selected LUN queue). The intra-type count limit may indicate a maximum quantity of commands of a specific command type (e.g., from a specific LUN queue) and from a specific LUN queue group (e.g., associated with a specific LUN) that are permitted to be stored in the execution queue group at the same time. As an example, there may be an intra-type count limit that limits the quantity of multi-plane host read commands associated with a particular LUN queue group (and/or a particular LUN) that are permitted to be in the execution queue group at the same time. In some implementations, only one multi-plane host read command per LUN (or per LUN queue group) may be permitted in the execution queue group. As another example, there may be an intra-type count limit that limits the quantity of write commands associated with a particular LUN queue group (and/or a particular LUN) that are permitted to be in the execution queue group at the same time. In some implementations, only one write command per LUN (or per LUN queue group) may be permitted in the execution queue group.

As shown by reference number 634, if transferring the selected command to the execution queue group would cause an intra-type count limit, associated with the selected command, to be exceeded, then the LUN scheduler 330 may refrain from transferring the selected command to the execution queue group and/or may select a next LUN queue. For example, the LUN scheduler 330 may select the next LUN queue from the currently selected LUN queue group (e.g., LUN queue group 3 in example 600), such as by selecting the single plane host read LUN queue for plane 1 of LUN 3. This may assist with load balancing across LUNs (e.g., by not skipping LUN 3). Alternatively, the LUN scheduler 330 may select the next LUN queue from a next LUN queue group, such as by selecting LUN queue group 1 in example 600. This may assist with a different type of load balancing across LUNs, such as by selecting the next LUN queue group when the currently selected LUN queue group has a backlog of commands in the execution queue group.

In some implementations, not all command types and/or LUN queues are associated with an intra-type count limit. Thus, the LUN scheduler 330 may first determine whether the selected command is associated with an intra-type count limit before determining whether that intra-type count limit would be exceeded by transferring the selected command to the execution queue group.

As shown by reference number 636, if transferring the selected command to the execution queue group would not cause an intra-type count limit, associated with the selected command, to be exceeded, then the LUN scheduler 330 may transfer the selected command to the execution queue group. In example 600, after selecting a multi-plane host read command from LUN queue group 3, the LUN scheduler 330 determines that an intra-type count limit for the multi-plane host read command is not exceeded, and then transfers the multi-plane host read command to the execution queue group. In example 600, the LUN scheduler 330 selects execution queue EP3 (e.g., associated with execution priority level EP3), for the multi-plane hose read command, as described above in connection with FIG. 5.

After transferring a command associated with an intra-type count limit to the execution queue group, the LUN scheduler 330 may increment an intra-type counter, associated with a command type of the command, that indicates an intra-type count value for the command type. The intra-type count value may indicate a quantity of commands of a particular command type (e.g., associated with a particular LUN and/or LUN queue group) that are currently stored in the execution queue group. The LUN scheduler 330 may decrement the intra-type counter based on an indication that a command, of the command type and/or associated with a particular LUN and/or LUN queue group, has been executed. For example, the command executor 345 may indicate, to the LUN scheduler 330, that a command has been executed. In some implementations, the memory device 120 may store separate intra-type counter values for different command types and different LUN queue groups.

In some implementations, the LUN scheduler may use an intra-LUN count limit in the same manner as the intra-type count limit. The intra-LUN count limit may indicate a maximum quantity of commands from a specific LUN queue group (e.g., associated with a specific LUN) that are permitted to be stored in the execution queue group at the same time. The LUN scheduler 330 may determine whether transferring the selected command to the execution queue group would cause the intra-LUN count limit, associated with the selected LUN queue group, to be exceeded. If transferring the selected command to the execution queue group would cause the intra-LUN count limit to be exceeded, then the LUN scheduler 330 may refrain from transferring the selected command to the execution queue group and/or may select a next LUN queue, as described above. If transferring the selected command to the execution queue group would not cause the intra-LUN count limit to be exceeded, then the LUN scheduler 330 may transfer the selected command to the execution queue group.

After transferring a command to the execution queue group, the LUN scheduler 330 may increment an intra-LUN counter, associated with the selected LUN queue group, that indicates an intra-LUN count value for the selected LUN queue group. The intra-LUN count value may indicate a quantity of commands from a particular LUN queue group that are currently stored in the execution queue group. The LUN scheduler 330 may decrement the intra-LUN counter based on an indication that a command associated with the particular LUN queue group has been executed. For example, the command executor 345 may indicate, to the LUN scheduler 330, that a command has been executed. In some implementations, the memory device 120 may store separate intra-LUN counter values for different LUN queue groups. In this way, the LUN scheduler 330 may improve load balancing across LUNs by placing a limit on the number of commands associated with a particular LUN that are permitted to be stored in the execution queue group at the same time.

Figure 6D:
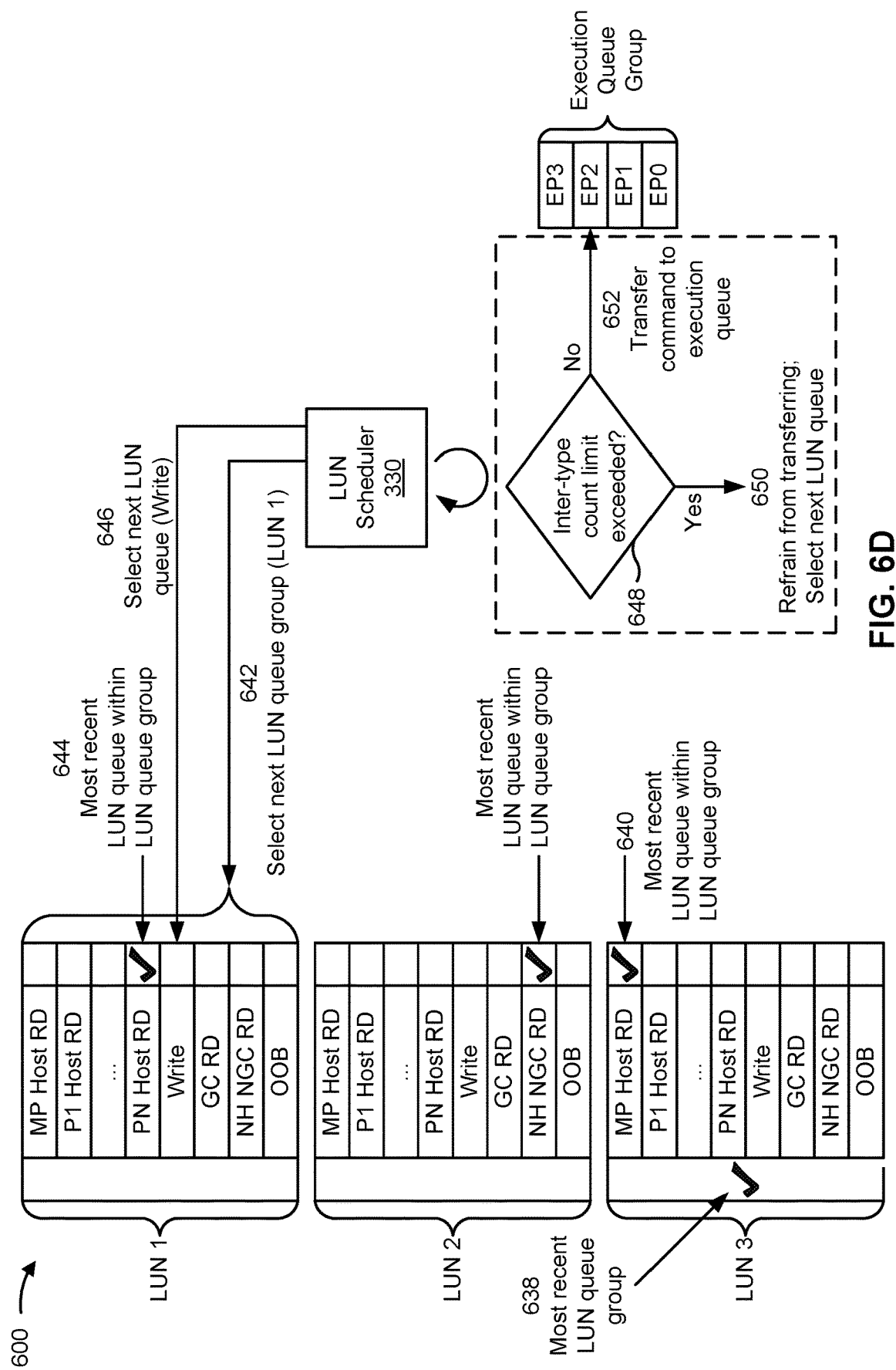

As shown in FIG. 6D, and by reference number 638, the memory device 120 may update the LUN queue group indication based on transferring a command to the execution queue group. For example, after transferring a multi-plane host read command from the multi-plane host read LUN queue of LUN queue group 3 (as described above in connection with FIG. 6C), the memory device 120 may update the LUN queue group indication to indicate that LUN queue group 3 is the most recently selected LUN queue group.

Similarly, as shown by reference number 640, the memory device 120 may update the LUN queue indication based on transferring a command to the execution queue group. For example, after transferring the multi-plane host read command from the multi-plane host read LUN queue of LUN queue group 3, the memory device 120 may update the LUN queue indication for LUN queue group 3 to indicate that the multi-plane host read LUN queue is the most recently selected LUN queue from LUN queue group 3.

As shown by reference number 642, because the most recently selected LUN queue group is LUN queue group 3 (e.g., as indicated by the LUN queue group indication), the LUN scheduler 330 selects LUN queue group 1, associated with LUN 1, as the next LUN queue group. In example 600, the memory device 120 includes three LUNs (LUN 1, LUN2, and LUN 3), so the LUN scheduler 330 cycles back to LUN queue group 1 after selecting LUN queue group 3. In example 600, the most recently selected LUN queue within LUN queue group 1 (e.g., as indicated by the LUN queue indication for LUN queue group 1) is the single plane LUN queue for plane N, as shown by reference number 644. This means that the last time that the LUN scheduler 330 selected LUN queue group 1 (e.g., a most recent selection of LUN queue group 1 before the current selection of LUN queue group 1), the LUN scheduler 330 transferred a command from the single plane LUN queue for plane N of LUN queue group 1.

As shown by reference number 646, because the most recently selected LUN queue within LUN queue group 1 is the single plane LUN queue for plane N, the LUN scheduler 330 selects the write LUN queue as the next LUN queue within LUN queue group 1.

As shown by reference number 648, in some implementations, the LUN scheduler 330 may determine whether transferring the selected command to the execution queue group would cause an inter-type count limit, associated with the selected command, to be exceeded for the execution queue group. In some implementations, the inter-type count limit may be specific to a selected LUN queue group, a selected LUN queue, and/or a set of command types (e.g., at least two command types), including a command type of the selected command. The inter-type count limit may indicate a maximum quantity of commands of a specific set of command type (e.g., from a specific set of LUN queues) and from a specific LUN queue group (e.g., associated with a specific LUN) that are permitted to be stored in the execution queue group at the same time. As an example, there may be an inter-type count limit that limits the combined quantity of write commands and erase command associated with a particular LUN queue group (and/or a particular LUN) that are permitted to be in the execution queue group at the same time. In some implementations, only one write command or erase command per LUN (or per LUN queue group) may be permitted in the execution queue group. Thus, if the execution queue group includes a write command for LUN 1, then the LUN scheduler 330 may not be permitted to transfer an erase command for LUN 1 to the execution queue group and may not be permitted to transfer another write command for LUN 1 to the execution queue group. This may prevent the execution queue group from including multiple commands that cannot be executed in parallel (e.g., because a write command cannot be performed on a LUN until an erase command is completed on the LUN, and vice versa).

As another example, there may be an inter-type count limit that limits the combined quantity of multi-plane host read commands and GC read commands (which are also multi-plane read commands) associated with a particular LUN queue group (and/or a particular LUN) that are permitted to be in the execution queue group at the same time. In some implementations, only one multi-plane host read command or GC read command per LUN (or per LUN queue group) may be permitted in the execution queue group. Thus, if the execution queue group includes a multi-plane host read command for LUN 1, then the LUN scheduler 330 may not be permitted to transfer a GC read command for LUN 1 to the execution queue group and may not be permitted to transfer another multi-plane host read command for LUN 1 to the execution queue group. This may prevent the execution queue group from including multiple commands that cannot be executed in parallel (e.g., multiple multi-plane read commands).

As another example, there may be an inter-type count limit that limits the combined quantity of multi-plane host read commands and single plane host read commands associated with a particular LUN queue group (and/or a particular LUN) that are permitted to be in the execution queue group at the same time. In some implementations, only one multi-plane host read command or single plane host read command per LUN (or per LUN queue group) may be permitted in the execution queue group. Thus, if the execution queue group includes a multi-plane host read command for LUN 1, then the LUN scheduler 330 may not be permitted to transfer a single plane host read command for LUN 1 to the execution queue group and may not be permitted to transfer another multi-plane host read command for LUN 1 to the execution queue group. This may prevent the execution queue group from including multiple commands that cannot be executed in parallel (e.g., multiple host read commands).

As shown by reference number 650, if transferring the selected command to the execution queue group would cause an inter-type count limit, associated with the selected command, to be exceeded, then the LUN scheduler 330 may refrain from transferring the selected command to the execution queue group and/or may select a next LUN queue. For example, the LUN scheduler 330 may select the next LUN queue from the currently selected LUN queue group (e.g., LUN queue group 1 in example 600), such as by selecting the GC read LUN queue for LUN queue group 1. This may assist with load balancing across LUNs (e.g., by not skipping LUN 1). Alternatively, the LUN scheduler 330 may select the next LUN queue from a next LUN queue group, such as by selecting LUN queue group 2 in example 600. This may assist with a different type of load balancing across LUNs, such as by selecting the next LUN queue group when the currently selected LUN queue group has a backlog of commands in the execution queue group.

In some implementations, not all command types and/or LUN queues are associated with an inter-type count limit. Thus, the LUN scheduler 330 may first determine whether the selected command is associated with an inter-type count limit before determining whether that inter-type count limit would be exceeded by transferring the selected command to the execution queue group.

As shown by reference number 652, if transferring the selected command to the execution queue group would not cause an inter-type count limit, associated with the selected command, to be exceeded, then the LUN scheduler 330 may transfer the selected command to the execution queue group. In example 600, after selecting a write command from LUN queue group 1, the LUN scheduler 330 determines that an inter-type count limit for the write command is not exceeded, and then transfers the write command to the execution queue group. In example 600, the LUN scheduler 330 selects execution queue EP2 (e.g., associated with execution priority level EP1), for the write command, as described above in connection with FIG. 5.

After transferring a command associated with an inter-type count limit to the execution queue group, the LUN scheduler 330 may increment an inter-type counter, associated with a command type of the command, that indicates an inter-type count value for a set of command types that includes the command type. The inter-type count value may indicate a quantity of commands of a set of command types (e.g., associated with a particular LUN and/or LUN queue group) that are currently stored in the execution queue group. The LUN scheduler 330 may decrement the inter-type counter based on an indication that a command, having a command type of the set of command types and/or associated with a particular LUN and/or LUN queue group, has been executed. For example, the command executor 345 may indicate, to the LUN scheduler 330, that a command has been executed. In some implementations, the memory device 120 may store separate inter-type counter values for different sets of command types and different LUN queue groups.

In some implementations, the LUN scheduler 330 may refrain from transferring any commands associated with a particular execution priority level from a particular LUN queue group to the execution queue group until execution of all other transferred commands from the particular LUN queue group that are associated with the particular execution priority level has been completed. For example, if the execution queue group includes a command from LUN queue group 1 associated with execution priority level EP2 (e.g., a write command or an erase command), then the LUN scheduler 330 may refrain from transferring another command from LUN queue group 1 associated with execution priority level EP2 until the command associated with execution priority level EP2 that is already stored in the execution queue group is executed. As another example, if the execution queue group includes a command from LUN queue group 1 associated with execution priority level EP3 (e.g., a multi-plane host read command or a single plane host read command), then the LUN scheduler 330 may refrain from transferring another command from LUN queue group 1 associated with execution priority level EP3 until the command associated with execution priority level EP3 that is already stored in the execution queue group is executed. This may prevent the execution queue group from including multiple commands that cannot be executed in parallel, as described above.

As indicated above, FIGS. 6A-6D are provided as examples. Other examples may differ from what is described with regard to FIGS. 6A-6D.

FIG. 7 is a flowchart of an example method 700 associated with using LUN queues and LUN queue scheduling. In some implementations, a memory device (e.g., memory device 120) may perform or may be configured to perform one or more process blocks of FIG. 7. In some implementations, another device or a group of devices separate from or including the memory device (e.g., the system 100) may perform or may be configured to perform one or more process blocks of FIG. 7. Additionally, or alternatively, one or more components of the memory device (e.g., the controller 130, the memory management component 250, the command reception component 260, the queue management component 270, the command execution component 280, the command processor 310, the LUN scheduler 330, and/or the command executor 345) may perform or may be configured to perform one or more process blocks of FIG. 7.

As shown in FIG. 7, the method 700 may include receiving a memory command associated with a logical unit number (LUN) of multiple LUNs associated with the memory device (block 710). As further shown in FIG. 7, the method 700 may include placing the memory command into a LUN queue, of a LUN queue group associated with the LUN, based on one or more parameters of the memory command, (block 720).

In some implementations, the LUN queue is one of multiple LUN queues included in the LUN queue group. In some implementations, the LUN queue group is one of multiple LUN queue groups associated with the memory device. In some implementations, each LUN queue group, included in the multiple LUN queue groups, is associated with a different LUN of the multiple LUNs associated with the memory device. In some implementations, each LUN queue, included in the LUN queue group, is associated with a respective intra-LUN priority level, of multiple intra-LUN priority levels associated with the memory device, that indicates a relative priority of commands in that LUN queue with respect to other commands in the LUN queue group. In some implementations, each LUN queue, included in the LUN queue group, is associated with an execution priority level, of multiple execution priority levels associated with the memory device, that indicates a relative priority of commands for execution on memory with respect to other commands. In some implementations, a quantity of the multiple intra-LUN priority levels is greater than a quantity of the multiple execution priority levels.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein, such as the operations described in connection with FIGS. 1-5, 6A-6D, and/or 8.

FIG. 8 is a flowchart of an example method 800 associated with using LUN queues and LUN queue scheduling. In some implementations, a memory device (e.g., memory device 120) may perform or may be configured to perform one or more process blocks of FIG. 8. In some implementations, another device or a group of devices separate from or including the memory device (e.g., the system 100) may perform or may be configured to perform one or more process blocks of FIG. 8. Additionally, or alternatively, one or more components of the memory device (e.g., the controller 130, the memory management component 250, the command reception component 260, the queue management component 270, the command execution component 280, the command processor 310, the LUN scheduler 330, and/or the command executor 345) may perform or may be configured to perform one or more process blocks of FIG. 8.

As shown in FIG. 8, the method 800 may include selecting a logical unit number (LUN) queue group, from which a command is to be transferred to an execution queue group, based on a most recently selected LUN queue group from which an immediately preceding command was transferred to the execution queue group (block 810). As further shown in FIG. 8, the method 800 may include selecting a LUN queue in the selected LUN queue group, from which the command is to be transferred to the execution queue group, based on a most recently selected LUN queue from which a most recently transferred command from the selected LUN queue group was transferred to the execution queue group (block 820). As shown in FIG. 8, the method 800 may include transferring the command from the selected LUN queue to the execution queue group (block 830).

In some implementations, the selected LUN queue group and the most recently selected LUN queue group are included in a plurality of LUN queue groups associated with the memory device. In some implementations, each LUN queue group, included in the plurality of LUN queue groups, is associated with a different LUN of a plurality of LUNs associated with the memory device. In some implementations, the selected LUN queue and the most recently selected LUN queue are included in a plurality of LUN queues that are included in the selected LUN queue group. In some implementations, each LUN queue, included in the plurality of LUN queues, is associated with an intra-LUN priority level used for selecting LUN queues within the LUN queue group and is associated with an execution priority level used for selecting commands from the execution queue group for execution. In some implementations, a quantity of intra-LUN priority levels associated with the selected LUN queue is greater than a quantity of execution priority levels associated with the execution queue group.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein, such as the operations described in connection with FIGS. 1-7.

In some implementations, a method includes receiving, by a memory device, a memory command associated with a logical unit number (LUN) of multiple LUNs associated with the memory device; and placing, by the memory device, the memory command into a LUN queue, of a LUN queue group associated with the LUN, based on one or more parameters of the memory command, wherein the LUN queue is one of multiple LUN queues included in the LUN queue group, wherein the LUN queue group is one of multiple LUN queue groups associated with the memory device, wherein each LUN queue group, included in the multiple LUN queue groups, is associated with a different LUN of the multiple LUNs associated with the memory device, wherein each LUN queue, included in the LUN queue group, is associated with a respective intra-LUN priority level, of multiple intra-LUN priority levels associated with the memory device, that indicates a relative priority of commands in that LUN queue with respect to other commands in the LUN queue group, wherein each LUN queue, included in the LUN queue group, is associated with an execution priority level, of multiple execution priority levels associated with the memory device, that indicates a relative priority of commands for execution on memory with respect to other commands, and wherein a quantity of the multiple intra-LUN priority levels is greater than a quantity of the multiple execution priority levels.

In some implementations, a memory device includes means for selecting a logical unit number (LUN) queue group, from which a command is to be transferred to an execution queue group, based on a most recently selected LUN queue group from which an immediately preceding command was transferred to the execution queue group, wherein the selected LUN queue group and the most recently selected LUN queue group are included in a plurality of LUN queue groups associated with the memory device, and wherein each LUN queue group, included in the plurality of LUN queue groups, is associated with a different LUN of a plurality of LUNs associated with the memory device; means for selecting a LUN queue in the selected LUN queue group, from which the command is to be transferred to the execution queue group, based on a most recently selected LUN queue from which a most recently transferred command from the selected LUN queue group was transferred to the execution queue group, wherein the selected LUN queue and the most recently selected LUN queue are included in a plurality of LUN queues that are included in the selected LUN queue group, wherein each LUN queue, included in the plurality of LUN queues, is associated with: an intra-LUN priority level used for selecting LUN queues within the LUN queue group, and an execution priority level used for selecting commands from the execution queue group for execution, wherein a quantity of intra-LUN priority levels associated with the selected LUN queue is greater than a quantity of execution priority levels associated with the execution queue group; and means for transferring the command from the selected LUN queue to the execution queue group.

In some implementations, a memory device includes a plurality of logical units configured to store data, wherein the plurality of logical units are identified by a corresponding plurality of logical unit numbers (LUNs); a plurality of LUN queue groups, wherein each LUN queue group, included in the plurality of LUN queue groups, is associated with a different LUN of the plurality of LUNs, wherein each LUN queue group includes a plurality of LUN queues, wherein each LUN queue, included in an individual LUN queue group of the plurality of LUN queue groups, is associated with a respective intra-LUN priority level that indicates a priority of that LUN queue compared to every other LUN queue included in the individual LUN queue group, wherein each LUN queue, included in the individual LUN queue group, is associated with an execution priority level that indicates a priority for execution of commands in that LUN queue compared to every other command included in the plurality of LUN queue groups, wherein a quantity of intra-LUN priority levels is greater than a quantity of execution priority levels; an execution queue group to which each command stored in the plurality of LUN queue groups is to be transferred for execution; a command processor configured to generate commands for placement in LUN queues of the LUN queue groups; a LUN scheduler configured to select and transfer commands from the plurality of LUN queue groups to the execution queue group based on intra-LUN priority levels; and a command executor configured to execute commands from the execution queue group based on execution priority levels.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a memory device, a memory command associated with a logical unit number (LUN) of multiple LUNs associated with the memory device; and
   placing, by the memory device, the memory command into a LUN queue, of a LUN queue group associated with the LUN, based on one or more parameters of the memory command,
   wherein the LUN queue is one of multiple LUN queues included in the LUN queue group,
   wherein the LUN queue group is one of multiple LUN queue groups associated with the memory device, wherein each LUN queue group, included in the multiple LUN queue groups, is associated with a different LUN of the multiple LUNs associated with the memory device,
wherein each LUN queue, included in the LUN queue group, is associated with a respective intra-LUN priority level, of multiple intra-LUN priority levels associated with the memory device, that indicates a relative priority of commands in that LUN queue with respect to other commands in the LUN queue group,
wherein each LUN queue, included in the LUN queue group, is associated with an execution priority level, of multiple execution priority levels associated with the memory device, that indicates a relative priority of commands for execution on memory with respect to other commands, and
wherein a quantity of the multiple intra-LUN priority levels is greater than a quantity of the multiple execution priority levels.

2. The method of claim 1, wherein the one or more parameters include at least one of:
whether the memory command is a read command, a write command, an erase command, or an out-of-band command,
whether the memory command is a host command or a non-host command, or
whether the memory command is a multi-plane command or a single plane command.

3. The method of claim 1, wherein the multiple LUN queues include:
a multi-plane host read LUN queue for multi-plane host read commands,
multiple single plane host read LUN queues for single plane host read commands, wherein each of the single plane host read LUN queues corresponds to a different plane associated with the LUN,
a write LUN queue for write commands,
a garbage collection read LUN queue for garbage collection read commands,
a non-host, non-garbage collection read LUN queue for non-host read commands other than garbage collection read commands, and
an out-of-band LUN queue for out-of-band commands, wherein the out-of-band commands are not read commands and are not write commands.

4. The method of claim 3, wherein:
the multi-plane host read LUN queue and the multiple single plane host read LUN queues are associated with a first execution priority level,
the write LUN queue is associated with a second execution priority level,
the garbage collection read LUN queue is associated with a third execution priority level, and
the non-host, non-garbage collection read LUN queue is associated with a fourth execution priority level.

5. The method of claim 4, wherein the out-of-band LUN queue is for erase commands and non-erase commands,
wherein the erase commands are associated with the second execution priority level, and
wherein the non-erase commands are associated with the fourth execution priority level.

6. The method of claim 1, further comprising:
determining that a quantity of memory commands, pending across all LUN queue groups of the multiple LUN queue groups, is less than a threshold; and
wherein placing the memory command into the LUN queue comprises placing the memory command into the LUN queue based on determining that the quantity of memory commands is less than the threshold.

7. The method of claim 1, wherein the quantity of the multiple execution priority levels is four, and wherein the quantity of the multiple intra-LUN priority levels is at least six.

8. The method of claim 1, wherein the quantity of the multiple execution priority levels is four, and wherein the quantity of the multiple intra-LUN priority levels is equal to five plus a quantity of planes associated with the LUN.

9. The method of claim 1, further comprising:
identifying a command, from a particular LUN queue group of the multiple LUN queue groups, to be transferred to an execution queue group, wherein the command is identified based on:
a most recently selected LUN queue group from which an immediately preceding command was transferred to the execution queue group, and
a most recently selected LUN queue, of the particular LUN queue group, from which a most recently transferred command was transferred from the particular LUN queue group to the execution queue group; and
transferring the identified command to the execution queue group for execution by the memory device.

10. A memory device, comprising:
means for selecting a logical unit number (LUN) queue group, from which a command is to be transferred to an execution queue group, based on a most recently selected LUN queue group from which an immediately preceding command was transferred to the execution queue group,
wherein the selected LUN queue group and the most recently selected LUN queue group are included in a plurality of LUN queue groups associated with the memory device, and
wherein each LUN queue group, included in the plurality of LUN queue groups, is associated with a different LUN of a plurality of LUNs associated with the memory device;
means for selecting a LUN queue in the selected LUN queue group, from which the command is to be transferred to the execution queue group, based on a most recently selected LUN queue from which a most recently transferred command from the selected LUN queue group was transferred to the execution queue group,
wherein the selected LUN queue and the most recently selected LUN queue are included in a plurality of LUN queues that are included in the selected LUN queue group,
wherein each LUN queue, included in the plurality of LUN queues, is associated with:
an intra-LUN priority level used for selecting LUN queues within the LUN queue group, and
an execution priority level used for selecting commands from the execution queue group for execution,
wherein a quantity of intra-LUN priority levels associated with the selected LUN queue is greater than a quantity of execution priority levels associated with the execution queue group; and
means for transferring the command from the selected LUN queue to the execution queue group.

11. The memory device of claim 10, further comprising:
means for storing a LUN queue group indication of the most recently selected LUN queue group based on transferring the immediately preceding command to the execution queue group; and
wherein the means for selecting the LUN queue group comprises means for selecting the LUN queue group based on the LUN queue group indication.

12. The memory device of claim 10, further comprising:
means for storing a LUN queue indication of the most recently selected LUN queue based on transferring the most recently transferred command from the selected LUN queue group to the execution queue group; and
wherein the means for selecting the LUN queue comprises means for selecting the LUN queue based on the LUN queue indication.

13. The memory device of claim 10, further comprising:
means for determining that the command is associated with an intra-type count limit for the execution queue group,
wherein the intra-type count limit is specific to the selected LUN queue group and is specific to a command type of the command; and
wherein the means for transferring the command from the selected LUN queue to the execution queue group comprises means for transferring the command based on determining that transferring the command would not cause the intra-type count limit to be exceeded.

14. The memory device of claim 13, further comprising:
means for refraining from transferring a next command, having the command type of the command, from the selected LUN queue group to the execution queue group based on a determination that transferring the next command would cause the intra-type count limit to be exceeded.

15. The memory device of claim 13, further comprising means for refraining from transferring any commands associated with a particular execution priority level from a particular LUN queue group to the execution queue group until execution of all other transferred commands from the particular LUN queue group that are associated with the particular execution priority level has been completed.

16. The memory device of claim 13, wherein the execution queue group is associated with an execution impact limit and each command in the plurality of LUN queue groups is associated with a corresponding execution impact that is based on a command type of that command or a corresponding LUN queue in which that command is placed; and
further comprising means for refraining from transferring a next command to the execution queue group if an execution impact of the next command would cause a total execution impact of all commands in the execution queue group to exceed the execution impact limit.

17. The memory device of claim 10, further comprising:
means for determining that the command is associated with an inter-type count limit for the execution queue group,
wherein the inter-type count limit is specific to the selected LUN queue group and is associated with a command type of the command and at least one other command type; and
wherein the means for transferring the command from the selected LUN queue to the execution queue group comprises means for transferring the command based on determining that transferring the command would not cause the inter-type count limit to be exceeded.

18. The memory device of claim 17, further comprising:
means for refraining from transferring a next command, having the command type of the command or having the at least one other command type, from the selected LUN queue group to the execution queue group based on a determination that transferring the next command would cause the inter-type count limit to be exceeded.

19. The memory device of claim 10, further comprising:
means for determining that the command is associated with an intra-LUN count limit for the execution queue group,
wherein the intra-LUN count limit is specific to the selected LUN queue group; and
wherein the means for transferring the command from the selected LUN queue to the execution queue group comprises means for transferring the command based on determining that transferring the command would not cause the intra-LUN count limit to be exceeded.

20. The memory device of claim 19, further comprising:
means for refraining from transferring a next command, associated with the selected LUN queue group, to the execution queue group based on a determination that transferring the next command would cause the intra-LUN count limit to be exceeded.

21. A memory device, comprising:
a plurality of logical units configured to store data, wherein the plurality of logical units are identified by a corresponding plurality of logical unit numbers (LUNs);
a plurality of LUN queue groups,
wherein each LUN queue group, included in the plurality of LUN queue groups, is associated with a different LUN of the plurality of LUNs,
wherein each LUN queue group includes a plurality of LUN queues,
wherein each LUN queue, included in an individual LUN queue group of the plurality of LUN queue groups, is associated with a respective intra-LUN priority level that indicates a priority of that LUN queue compared to every other LUN queue included in the individual LUN queue group,
wherein each LUN queue, included in the individual LUN queue group, is associated with an execution priority level that indicates a priority for execution of commands in that LUN queue compared to every other command included in the plurality of LUN queue groups,
wherein a quantity of intra-LUN priority levels is greater than a quantity of execution priority levels;
an execution queue group to which each command stored in the plurality of LUN queue groups is to be transferred for execution;
a command processor configured to generate commands for placement in LUN queues of the LUN queue groups;
a LUN scheduler configured to select and transfer commands from the plurality of LUN queue groups to the execution queue group based on intra-LUN priority levels; and
a command executor configured to execute commands from the execution queue group based on execution priority levels.

22. The memory device of claim 21, wherein the command processor is configured to:
identify a LUN queue group, of the plurality of LUN queue groups, for the command based on a LUN with which the command is associated;

identify a LUN queue, within the LUN queue group, for the command based on one or more parameters of the command; and add the command to the LUN queue.

23. The memory device of claim 22, wherein the command processor is configured to identify the LUN queue for the command based on whether the command is:

a multi-plane host read command,
a single plane host read command,
a write command,
a garbage collection read command,
a non-host read command other than the garbage collection read commands,
an erase command, or
an out-of-band command that is not a read command, a write command, or an erase command.

24. The memory device of claim 21, wherein the LUN scheduler is configured to:

identify a LUN queue group, from which a command is to be transferred to the execution queue group, based on a most recently selected LUN queue group from which an immediately preceding command was transferred to the execution queue group;

identify a LUN queue, in the LUN queue group, from which the command is to be transferred to the execution queue group based on a most recently selected LUN queue, in the LUN queue group, from which a most recently transferred command from the LUN queue group was transferred to the execution queue group; and transfer the command from the LUN queue to the execution queue group.

25. The memory device of claim 24, wherein the command is an oldest command in the LUN queue.

* * * * *